(12) United States Patent (10) Patent No.: US 8,394,919 B2
Mishra et al. (45) Date of Patent: Mar. 12, 2013

(54) SEMICONDUCTOR MATERIALS BASED ON DITHIENOPYRIDONE COPOLYMERS

(75) Inventors: Ashok Kumar Mishra, Singapore (SG); Subramanian Vaidyanathan, Basel (CH); Hiroyoshi Noguchi, Singapore (SG); Florian Dötz, Mannheim (DE); Yucui Guan, Hangzhou (CN)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/454,467

(22) Filed: Apr. 24, 2012

(65) Prior Publication Data

US 2012/0277391 A1 Nov. 1, 2012

Related U.S. Application Data

(60) Provisional application No. 61/479,444, filed on Apr. 27, 2011.

(51) Int. Cl.
*C08G 75/00* (2006.01)
(52) U.S. Cl. .......... 528/377; 528/380; 528/370
(58) Field of Classification Search .......... 528/377, 528/380, 370
See application file for complete search history.

(56) References Cited

U.S. PATENT DOCUMENTS

2011/0213117 A1 9/2011 Facchetti

FOREIGN PATENT DOCUMENTS

WO WO 2010/052287 A1 5/2010

OTHER PUBLICATIONS

International Search Report and Written Opinion issued Aug. 9, 2012 in PCT/EP2012/056943 filed Apr. 16, 2012.
G.J. Heeres, et al., "Thiophene Analogues of Phenanthridone", Synthetic Communications, vol. 1, No. 1, XP009153650, Jan. 1, 1971, pp. 29-31.
Ralph Rieger, et al., "Rational Optimization of Benzo[2,1-b;3,4-b]dithiophene—Containing Polymers for Organic Field-Effect Transistors", Advanced Materials, vol. 22, No. 1, XP009136434, Jan. 1, 2010, pp. 83-86.

*Primary Examiner* — Shane Fang
(74) *Attorney, Agent, or Firm* — Oblon, Spivak, McClelland, Maier & Neustadt, L.L.P.

(57) ABSTRACT

The present invention provides a polymer comprising a unit of formula

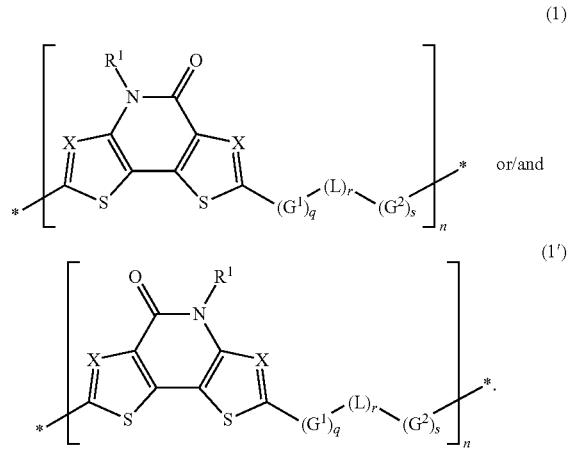

The present invention also provides an electronic device comprising the polymer as semiconducting material.

20 Claims, No Drawings

SEMICONDUCTOR MATERIALS BASED ON DITHIENOPYRIDONE COPOLYMERS

CROSS REFERENCE TO RELATED APPLICATIONS

This application claims priority to U.S. Provisional Patent Application No. 61/479,444, filed Apr. 27, 2011, the enclosure of which is incorporated herein in its entirety, by reference.

Organic semiconducting materials can be used in electronic devices such as organic photovoltaic devices (OPVs), organic field-effect transistors (OFETs), organic light emitting diodes (OLEDs), and organic electrochromic devices (ECDs).

For efficient and long lasting performance, it is desirable that the organic semiconducting material-based devices show high charge carrier mobility as well as high stability, in particular towards oxidation by air, under ambient environmental conditions.

Furthermore, it is desirable that the organic semiconducting materials are compatible with liquid processing techniques such as spin coating as liquid processing techniques are convenient from the point of processability, and thus allow the production of low cost organic semiconducting material-based electronic devices. In addition, liquid processing techniques are also compatible with plastic substrates, and thus allow the production of light weight and mechanically flexible organic semiconducting material-based electronic devices.

The use of polymeric organic semiconducting materials in electronic devices is known in the art.

Zhang, M.; Tsao, H. N.; Pisula, W.; Yang, C.; Mishra, A. K.; Müllen, K. *J. Am. Chem. Soc.* 2007, 129, 3472-3473 describes polymers of formula

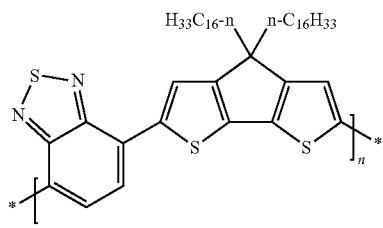

for use in organic field effect transistors (OFETs).

Xiao, S; Zhou H.; You, W. *Macromolecules* 2008, 41, 5688-5696 describes the following polymers

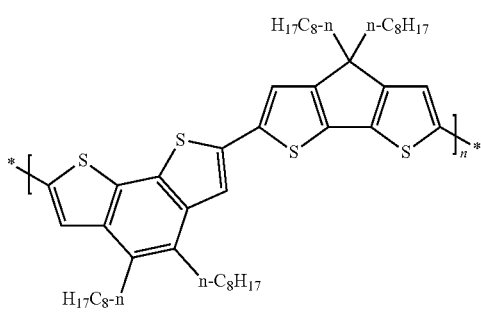

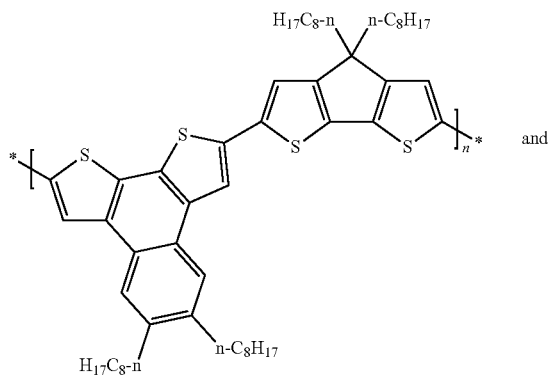

and

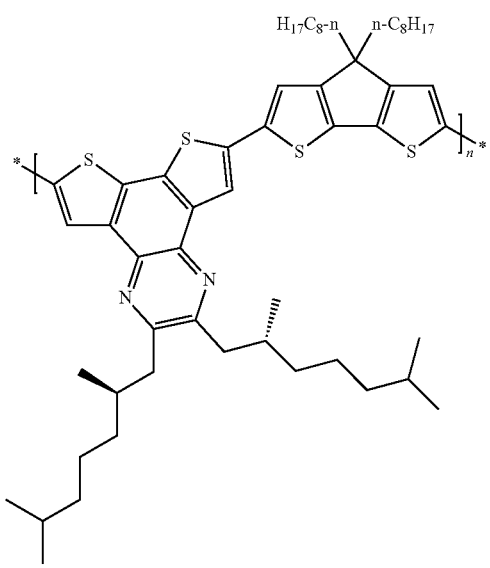

as donor materials for use in photovoltaic devices.

Scharber, M. C.; Koppe, M.; Gao, J.; Cordella, F.; Loi, M. A.; Denk, P.; Morana, M.; Egelhaaf, H.-J.; Forberich, K.; Dennler, G.; Gaudiana, R.; Waller, D.; Zhu, Z.; Shi, X.; Brabec, C. J. *Adv. Mater.* 2009, 21, 1-4 describes the following polymers

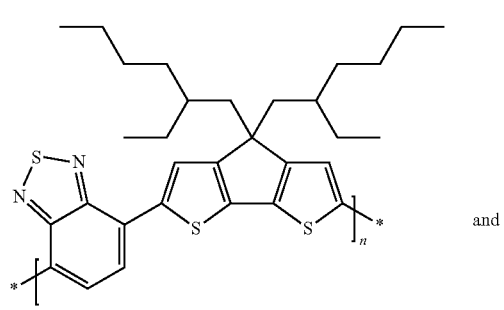

and

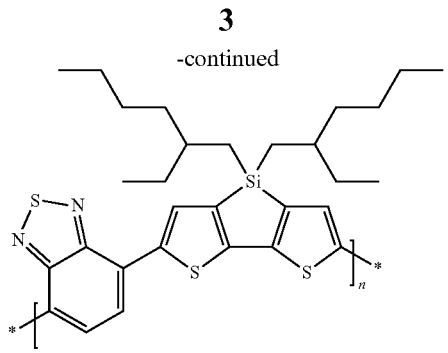

as donor materials for use in solar cells.

Rieger, R.; Beckmann, D.; Pisula, W.; Steffen, W.; Kastler, M.; Müllen K. *Adv. Mater.* 2010, 22, 83-86 describes the following polymers

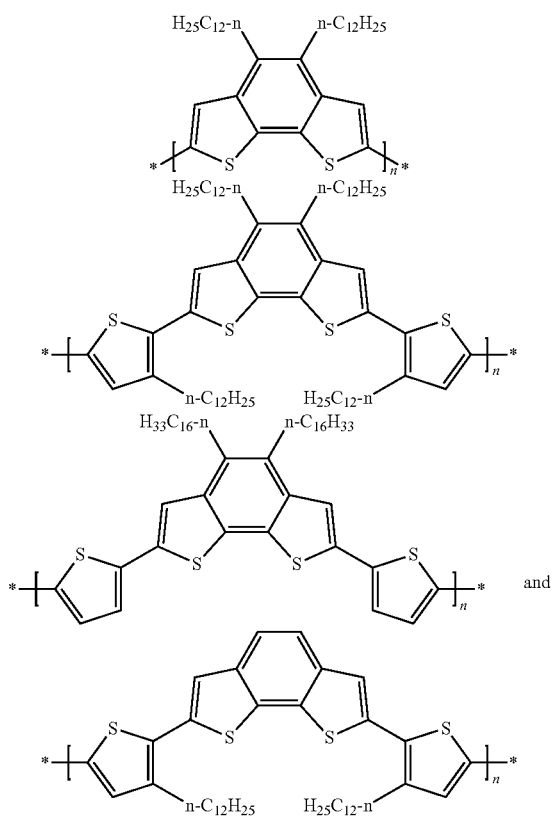

for use in organic field-effect transistor (OFET).

Junying Liu, Rui Zhang, Geneviève Sauvé, Tomasz Kowalewski, Richard D. McCullough, *J. Am. Chem. Soc.* 2008, 130, 13167-13176 describes the polymers

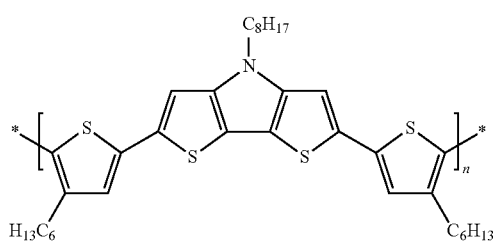

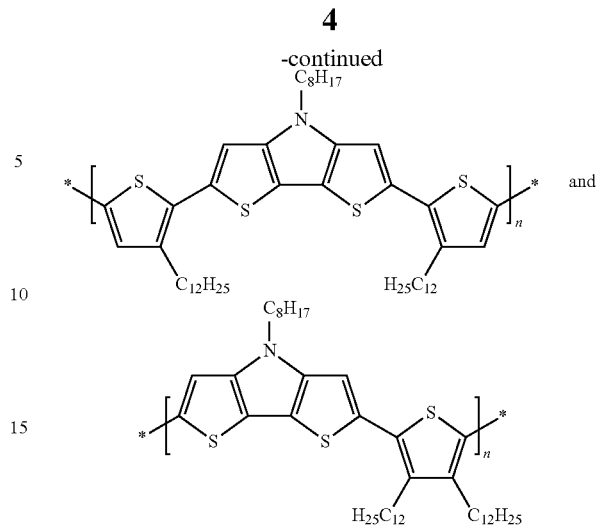

for use in organic field-effect transistor (OFET).

Xugang Guo, Rocio P. Ortiz, Yan Zheng, Yan Hu, Yong-Young Noh, Kang-Jun Baeg, Antonio Facchetti, Tobin J. Marks, *J. Am. Chem. Soc.* 2011, 133, 1405-1418 describes the polymers

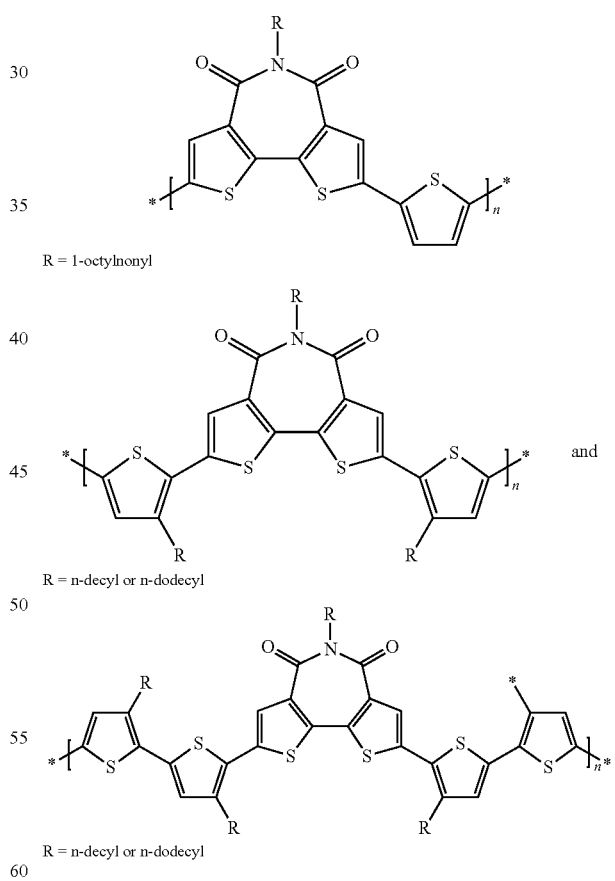

for use in organic field-effect transistor (OFET).

Monomeric dithienopyridone is also known in the art.

G. J. Heeres and H. Wynberg, *Synth. Comm.* 1971, 1, 29 to 31 report the synthesis of dithienopyridone monomer of formula

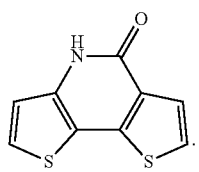 [SMILES: O=c1[nH]c2ccsc2c2sccc12]

It was the object of the present invention to provide new polymeric semiconducting materials.

This object is solved by the polymer of claim 1 and the electronic device of claim 15.

The semiconducting material of the present invention is a polymer comprising a unit of formula

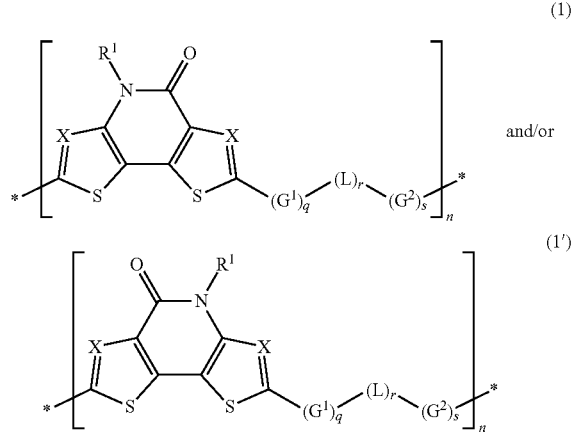

wherein
R$^1$ is H, C$_{1-30}$-alkyl optionally substituted with 1 to 6 substituents R$^c$, C$_{2-30}$-alkenyl optionally substituted with 1 to 6 substituents R$^c$, C$_{2-30}$-alkynyl optionally substituted with 1 to 6 substituents R$^c$, C$_{3-10}$-cycloalkyl optionally substituted with 1 to 6 substituents R$^d$, C$_{5-10}$-cycloalkenyl optionally substituted with 1 to 6 substituents R$^d$, monovalent 3 to 14 membered aliphatic heterocyclic residue optionally substituted with 1 to 6 substituents R$^d$, C$_{6-14}$-aryl optionally substituted with 1 to 6 substituents R$^e$ or monovalent 5 to 14 membered aromatic heterocyclic residue optionally substituted with 1 to 6 substituents R$^e$,
wherein
R$^c$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{3-10}$-cycloalkyl, monovalent 3 to 14 membered aliphatic heterocyclic residue, C$_{6-14}$-aryl and monovalent 5 to 14 membered aromatic heterocyclic residue;
R$^d$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{1-10}$-alkyl, C$_{2-10}$-alkenyl, C$_{2-10}$-alkynyl, C$_{6-14}$-aryl and monovalent 5 to 14 membered aromatic heterocyclic residue;
R$^e$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{1-10}$-alkyl, C$_{2-10}$-alkenyl, C$_{2-10}$-alkynyl, C$_{3-10}$-cycloalkyl, C$_{5-10}$-cycloalkenyl and monovalent 3 to 14 membered aliphatic heterocyclic residue,
wherein R$^2$ and R$^3$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, X is N or C—R$^4$,
wherein
R$^4$ is H, C$_{1-30}$-alkyl optionally substituted with 1 to 6 substituents R$^f$, C$_{2-30}$-alkenyl optionally substituted with 1 to 6 substituents R$^f$, C$_{2-30}$-alkynyl optionally substituted with 1 to 6 substituents R$^f$, C$_{3-10}$-cycloalkyl optionally substituted with 1 to 6 substituents R$^g$, C$_{5-10}$-cycloalkenyl optionally substituted with 1 to 6 substituents R$^g$, monovalent 3 to 14 membered aliphatic heterocyclic residue optionally substituted with 1 to 6 substituents R$^g$, C$_{6-14}$-aryl optionally substituted with 1 to 6 substituents R$^h$ or monovalent 5 to 14 membered aromatic heterocyclic residue optionally substituted with 1 to 6 substituents R$^h$,
wherein
R$^f$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{3-10}$-cycloalkyl, monovalent 3 to 14 membered aliphatic heterocyclic residue, C$_{6-14}$-aryl and monovalent 5 to 14 membered aromatic heterocyclic residue;
R$^g$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{2-10}$-alkenyl, C$_{2-10}$-alkynyl, C$_{6-14}$-aryl and monovalent 5 to 14 membered aromatic heterocyclic residue;
R$^h$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{1-10}$-alkyl, C$_{2-10}$-alkenyl, C$_{2-10}$-alkynyl, C$_{3-10}$-cycloalkyl, C$_{5-10}$-cycloalkenyl and monovalent 3 to 14 membered aliphatic heterocyclic residue, wherein $R^5$ and $R^6$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, $G^1$ and $G^2$ are independently from each other $C_{6-14}$-arylene optionally substituted with 1 to 6 substituents $R^a$ or bivalent 5 to 14 membered aromatic heterocyclic residue optionally substituted with 1 to 6 substituents $R^a$, wherein
$R^a$ at each occurrence are independently from each other selected from the group consisting of =O, =C(CN)$_2$, —O—C$_{2-6}$-alkylene-O—, halogen, —CN, —NO$_2$, —OH, C$_{1-30}$-alkoxy, —O—CH$_2$CH$_2$O—C$_{1-30}$-alkyl, —O—COR$^8$, —S—C$_{1-30}$-alkyl, —NH$_2$, —NHR$^8$, —NR$^8$R$^9$, —NH—COR$^8$, —COOH, —COOR$^8$, —CONH$_2$, —CONHR$^8$, —CONR$^8$R$^9$, —CO—H, —COR$^8$, C$_{1-30}$-alkyl optionally substituted with 1 to 6 substituents $R^i$, C$_{2-30}$-alkenyl optionally substituted with 1 to 6 substituents $R^i$, C$_{2-30}$-alkynyl optionally substituted with 1 to 6 substituents $R^i$, C$_{3-10}$-cycloalkyl optionally substituted with 1 to 6 substituents $R^j$, C$_{5-10}$-cycloalkenyl optionally substituted with 1 to 6 substituents $R^j$ and monovalent 3 to 14 membered aliphatic heterocyclic residue optionally substituted with 1 to 6 substituents $R^j$, wherein
$R^8$ and $R^9$ at each occurrence are independently from each other selected from the group consisting of $C_{1-30}$-alkyl, $C_{2-30}$-alkenyl, $C_{2-30}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, $R^i$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{10}$, —S—C$_{1-10}$-alkyl, —NH$_2$, —NHR$^{10}$, —NR$^{10}$R$^{11}$, —NH—COR$^{10}$, —COON, —COOR$^{10}$, —CONH$_2$, —CONHR$^{10}$, —CONR$^{10}$R$^{11}$, —CO—H, —COR$^{10}$, C$_{3-10}$-cycloalkyl, monovalent 3 to 14 membered aliphatic heterocyclic residue, $C_{6-14}$-aryl and monovalent 5 to 14 membered aromatic heterocyclic residue;

$R^j$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{10}$, —S—C$_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, C$_{1-10}$-alkyl, C$_{2-10}$-alkenyl, C$_{2-10}$-alkynyl, C$_{6-14}$-aryl and monovalent 5 to 14 membered aromatic heterocyclic residue;

wherein $R^{10}$ and $R^{11}$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, or
$G^1$ and $G^2$ are independently from each other

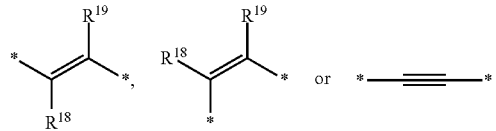

wherein
$R^{18}$ and $R^{19}$ are independently from each other H or $C_{1-30}$-alkyl, L is $C_{6-24}$-arylene optionally substituted with 1 to 6 substituents $R^b$ or bivalent 5 to 24 membered aromatic heterocyclic residue optionally substituted with 1 to 6 substituents $R^b$, wherein
$R^b$ at each occurrence are independently from each other selected from the group consisting of =O, =C(CN)$_2$, —O—C$_{2-6}$-alkylene-O—, halogen, —CN, —NO$_2$, —OH, C$_{1-30}$-alkoxy, —O—CH$_2$CH$_2$O—C$_{1-30}$-alkyl, —O—COR$^{12}$, —S—C$_{1-30}$-alkyl, —NH$_2$, —NHR$^{12}$, —NR$^{12}$R$^{13}$, —NH—COR$^{12}$, —COOH, —COOR$^{12}$, —CONH$_2$, —CONHR$^{12}$, —CONR$^{12}$R$^{13}$, —CO—H, —COR$^{12}$, C$_{1-30}$-alkyl optionally substituted with 1 to 6 substituents $R^k$, C$_{2-30}$-alkenyl optionally substituted with 1 to 6 substituents $R^k$, C$_{2-30}$-alkynyl optionally substituted with 1 to 6 substituents $R^k$, C$_{3-10}$-cycloalkyl optionally substituted with 1 to 6 substituents $R^l$, C$_{5-10}$-cycloalkenyl optionally substituted with 1 to 6 substituents $R^l$ and monovalent 3 to 14 membered aliphatic heterocyclic residue optionally substituted with 1 to 6 substituents $R^l$, wherein
$R^{12}$ and $R^{13}$ at each occurrence are independently from each other selected from the group consisting of $C_{1-30}$-alkyl, $C_{2-30}$-alkenyl, $C_{2-30}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, $R^k$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{14}$, —S—C$_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, C$_{3-10}$-cycloalkyl, monovalent 3 to 14 membered aliphatic heterocyclic residue, $C_{6-14}$-aryl and monovalent 5 to 14 membered aromatic heterocyclic residue;

$R^l$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{14}$, —S—C$_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, C$_{1-10}$-alkyl, C$_{2-10}$-alkenyl, C$_{2-10}$-alkynyl, C$_{6-14}$-aryl and monovalent 5 to 14 membered aromatic heterocyclic residue;

wherein $R^{14}$ and $R^{15}$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, or L is

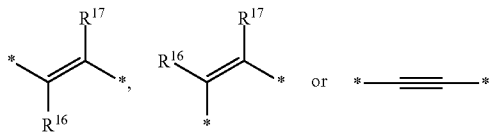

wherein

R$^{16}$ and R$^{17}$ are independently from each other H, C$_{1-30}$-alkyl, —CN or halogen, q and s are independently from each other 0, 1, 2, 3, 4 or 5, r is 0, 1 or 2, and n is an integer from 2 to 10,000.

Preferably, the semiconducting material of the present invention is a polymer consisting essentially of a unit formula

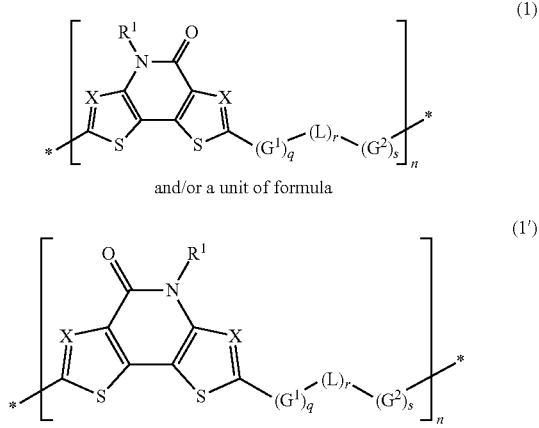

and/or a unit of formula (1')

wherein

R$^1$ is H, C$_{1-30}$-alkyl optionally substituted with 1 to 6 substituents R$^c$, C$_{2-30}$-alkenyl optionally substituted with 1 to 6 substituents R$^c$, C$_{2-30}$-alkynyl optionally substituted with 1 to 6 substituents R$^c$, C$_{3-10}$-cycloalkyl optionally substituted with 1 to 6 substituents R$^d$, C$_{5-10}$-cycloalkenyl optionally substituted with 1 to 6 substituents R$^d$, monovalent 3 to 14 membered aliphatic heterocyclic residue optionally substituted with 1 to 6 substituents R$^d$, C$_{6-14}$-aryl optionally substituted with 1 to 6 substituents R$^e$ or monovalent 5 to 14 membered aromatic heterocyclic residue optionally substituted with 1 to 6 substituents R$^e$, wherein R$^c$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{3-10}$-cycloalkyl, monovalent 3 to 14 membered aliphatic heterocyclic residue, C$_{6-14}$-aryl and monovalent 5 to 14 membered aromatic heterocyclic residue;

R$^d$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{1-10}$-alkyl, C$_{2-10}$-alkenyl, C$_{2-10}$-alkynyl, C$_{6-14}$-aryl and monovalent 5 to 14 membered aromatic heterocyclic residue;

R$^e$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{1-10}$-alkyl, C$_{2-10}$-alkenyl, C$_{2-10}$-alkynyl, C$_{3-10}$-cycloalkyl, C$_{5-10}$-cycloalkenyl and monovalent 3 to 14 membered aliphatic heterocyclic residue, wherein R$^2$ and R$^3$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, X is N or C—R$^4$, wherein R$^4$ is H, C$_{1-30}$-alkyl optionally substituted with 1 to 6 substituents R$^f$, C$_{2-30}$-alkenyl optionally substituted with 1 to 6 substituents R$^f$, C$_{2-30}$-alkynyl optionally substituted with 1 to 6 substituents R$^f$, C$_{3-10}$-cycloalkyl optionally substituted with 1 to 6 substituents R$^g$, C$_{5-10}$-cycloalkenyl optionally substituted with 1 to 6 substituents R$^h$, monovalent 3 to 14 membered aliphatic heterocyclic residue optionally substituted with 1 to 6 substituents R$^g$, C$_{6-14}$-aryl optionally substituted with 1 to 6 substituents R$^h$ or monovalent 5 to 14 membered aromatic heterocyclic residue optionally substituted with 1 to 6 substituents R$^h$, wherein R$^f$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{3-10}$-cycloalkyl, monovalent 3 to 14 membered aliphatic heterocyclic residue, C$_{6-14}$-aryl and monovalent 5 to 14 membered aromatic heterocyclic residue;

R$^g$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{1-10}$-alkyl, C$_{2-10}$-alkenyl, C$_{2-10}$-alkynyl, C$_{6-14}$-aryl and monovalent 5 to 14 membered aromatic heterocyclic residue;

R$^h$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{1-10}$-alkyl, C$_{2-10}$-alkenyl, C$_{2-10}$-alkynyl, C$_{3-10}$-cycloalkyl, C$_{5-10}$-cycloalkenyl and monovalent 3 to 14 membered aliphatic heterocyclic residue,
  wherein R$^5$ and R$^6$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, G$^1$ and G$^2$ are independently from each other C$_{6-14}$-arylene optionally substituted with 1 to 6 substituents R$^a$ or bivalent 5 to 14 membered aromatic heterocyclic residue optionally substituted with 1 to 6 substituents R$^a$,
wherein
  R$^a$ at each occurrence are independently from each other selected from the group consisting of =O, =C(CN)$_2$, —O—C$_{2-6}$-alkylene-O—, halogen, —CN, —NO$_2$, —OH, C$_{1-30}$-alkoxy, —O—CH$_2$CH$_2$O—C$_{1-30}$-alkyl, —O—COR$^8$, —S—C$_{1-30}$-alkyl, —NH$_2$, —NHR$^8$, —NR$^8$R$^9$, —NH—COR$^8$, —COOH, —COOR$^8$, —CONH$_2$, —CONHR$^8$, —CONR$^8$R$^9$, —CO—H, —COR$^8$, C$_{1-30}$-alkyl optionally substituted with 1 to 6 substituents R$^i$, C$_{2-30}$-alkenyl optionally substituted with 1 to 6 substituents R$^i$, C$_{2-30}$-alkynyl optionally substituted with 1 to 6 substituents R$^i$, C$_{3-10}$-cycloalkyl optionally substituted with 1 to 6 substituents R$^j$, C$_{5-10}$-cycloalkenyl optionally substituted with 1 to 6 substituents R$^j$ and monovalent 3 to 14 membered aliphatic heterocyclic residue optionally substituted with 1 to 6 substituents R$^j$,
  wherein
  R$^8$ and R$^9$ at each occurrence are independently from each other selected from the group consisting of C$_{1-30}$-alkyl, C$_{2-30}$-alkenyl, C$_{2-30}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue,
  R$^i$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{10}$, —S—C$_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, C$_{3-10}$-cycloalkyl, monovalent 3 to 14 membered aliphatic heterocyclic residue, C$_{6-14}$-aryl and monovalent 5 to 14 membered aromatic heterocyclic residue;
  R$^j$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{10}$, —S—C$_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, C$_{1-10}$-alkyl, C$_{2-10}$-alkenyl, C$_{2-10}$-alkynyl, C$_{6-14}$-aryl and monovalent 5 to 14 membered aromatic heterocyclic residue;
    wherein R$^{10}$ and R$^{11}$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, or
G$^1$ and G$^2$ are independently from each other

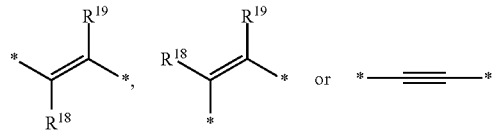

wherein
  R$^{18}$ and R$^{19}$ are independently from each other H or C$_{1-30}$-alkyl,
L is C$_{6-24}$-arylene optionally substituted with 1 to 6 substituents R$^b$ or bivalent 5 to 24 membered aromatic heterocyclic residue optionally substituted with 1 to 6 substituents R$^b$,
wherein
  R$^b$ at each occurrence are independently from each other selected from the group consisting of =O, =C(CN)$_2$, —O—C$_{2-6}$-alkylene-O—, halogen, —CN, —NO$_2$, —OH, C$_{1-30}$-alkoxy, —O—CH$_2$CH$_2$O—C$_{1-30}$-alkyl, —O—COR$^{12}$, —S—C$_{1-30}$-alkyl, —NH$_2$, —NHR$^{12}$, —NR$^{12}$R$^{13}$, —NH—COR$^{12}$, —COOH, —COOR$^{12}$, —CONH$_2$, —CONHR$^{12}$, —CONR$^{12}$R$^{13}$, —CO—H, —COR$^{12}$, C$_{1-30}$-alkyl optionally substituted with 1 to 6 substituents R$^k$, C$_{2-30}$-alkenyl optionally substituted with 1 to 6 substituents R$^k$, C$_{2-30}$-alkynyl optionally substituted with 1 to 6 substituents R$^k$, C$_{3-10}$-cycloalkyl optionally substituted with 1 to 6 substituents R$^l$, C$_{5-10}$-cycloalkenyl optionally substituted with 1 to 6 substituents R$^l$ and monovalent 3 to 14 membered aliphatic heterocyclic residue optionally substituted with 1 to 6 substituents R$^l$,
  wherein
  R$^{12}$ and R$^{13}$ at each occurrence are independently from each other selected from the group consisting of C$_{1-30}$-alkyl, C$_{2-30}$-alkenyl, C$_{2-30}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue,
  R$^k$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{14}$, —S—C$_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, C$_{3-10}$-cycloalkyl, monovalent 3 to 14 membered aliphatic heterocyclic residue, C$_{6-14}$-aryl and monovalent 5 to 14 membered aromatic heterocyclic residue;
  R$^l$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{14}$, —S—C$_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, C$_{1-10}$-alkyl, C$_{2-10}$-alkenyl, C$_{2-10}$-alkynyl, C$_{6-14}$-aryl and monovalent 5 to 14 membered aromatic heterocyclic residue;
    wherein R$^{14}$ and R$^{15}$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, $C_{6-14}$-aryl and monovalent 5 to 14 membered aromatic heterocyclic residue, or L is

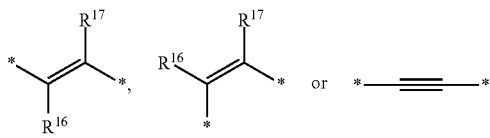

wherein $R^{16}$ and $R^{17}$ are independently from each other H, $C_{1-30}$-alkyl, —CN or halogen, q and s are independently from each other 0, 1, 2, 3, 4 or 5, r is 0, 1 or 2, and n is an integer from 2 to 10,000.

The term "essentially consisting of" means that at least 80% by weight, more preferably at least 90% by weight, of the polymer consists of the sum of units of formula (1) and (1') based on the weight of the polymer.

More preferably, the semiconducting material of the present invention is a polymer consisting of a unit of formula

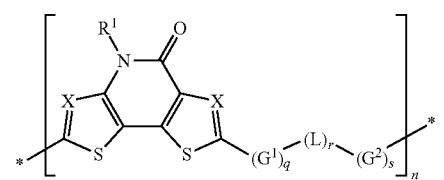

or a unit of formula

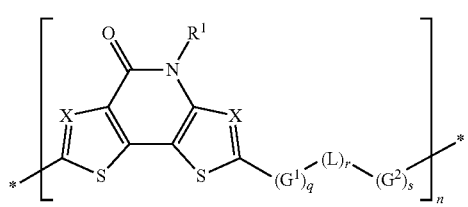

wherein $R^1$ is H, $C_{1-30}$-alkyl optionally substituted with 1 to 6 substituents $R^c$, $C_{2-30}$-alkenyl optionally substituted with 1 to 6 substituents $R^c$, $C_{2-30}$-alkynyl optionally substituted with 1 to 6 substituents $R^c$, $C_{3-10}$-cycloalkyl optionally substituted with 1 to 6 substituents $R^d$, $C_{5-10}$-cycloalkenyl optionally substituted with 1 to 6 substituents $R^d$, monovalent 3 to 14 membered aliphatic heterocyclic residue optionally substituted with 1 to 6 substituents $R^d$, $C_{6-14}$-aryl optionally substituted with 1 to 6 substituents $R^e$ or monovalent 5 to 14 membered aromatic heterocyclic residue optionally substituted with 1 to 6 substituents $R^e$, wherein $R^c$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^2$, —S—$C_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, $C_{3-10}$-cycloalkyl, monovalent 3 to 14 membered aliphatic heterocyclic residue, $C_{6-14}$-aryl and monovalent 5 to 14 membered aromatic heterocyclic residue;

$R^d$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —CH$_2$CH$_2$O—$C_{1-10}$-alkyl, —O—COR$^2$, —S—$C_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, $C_{1-10}$-alkyl, $C_{2-10}$-alkenyl, $C_{2-10}$-alkynyl, $C_{6-14}$-aryl and monovalent 5 to 14 membered aromatic heterocyclic residue;

$R^e$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^2$, —S—$C_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, $C_{1-10}$-alkyl, $C_{2-10}$-alkenyl, $C_{2-10}$-alkynyl, $C_{3-10}$-cycloalkyl, $C_{5-10}$-cycloalkenyl and monovalent 3 to 14 membered aliphatic heterocyclic residue, wherein $R^2$ and $R^3$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, X is N or C—R$^4$, wherein $R^4$ is H, $C_{1-30}$-alkyl optionally substituted with 1 to 6 substituents $R^f$, $C_{2-30}$-alkenyl optionally substituted with 1 to 6 substituents $R^f$, $C_{2-30}$-alkynyl optionally substituted with 1 to 6 substituents $R^f$, $C_{3-10}$-cycloalkyl optionally substituted with 1 to 6 substituents $R^g$, $C_{5-10}$-cycloalkenyl optionally substituted with 1 to 6 substituents $R^g$, monovalent 3 to 14 membered aliphatic heterocyclic residue optionally substituted with 1 to 6 substituents $R^g$, $C_{6-14}$-aryl optionally substituted with 1 to 6 substituents $R^h$ or monovalent 5 to 14 membered aromatic heterocyclic residue optionally substituted with 1 to 6 substituents $R^h$, wherein $R^f$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^5$, —S—$C_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, $C_{3-10}$-cycloalkyl, monovalent 3 to 14 membered aliphatic heterocyclic residue, $C_{6-14}$-aryl and monovalent 5 to 14 membered aromatic heterocyclic residue;

$R^g$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^5$, —S—$C_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, $C_{1-10}$-alkyl, $C_{2-10}$-alkenyl, $C_{2-10}$-alkynyl, $C_{6-14}$-aryl and monovalent 5 to 14 membered aromatic heterocyclic residue;

$R^h$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{1-10}$-alkyl, C$_{2-10}$-alkenyl, C$_{2-10}$-alkynyl, C$_{3-10}$-cycloalkyl, C$_{5-10}$-cycloalkenyl and monovalent 3 to 14 membered aliphatic heterocyclic residue,
wherein R$^5$ and R$^6$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, G$^1$ and G$^2$ are independently from each other C$_{6-14}$-arylene optionally substituted with 1 to 6 substituents R$^a$ or bivalent 5 to 14 membered aromatic heterocyclic residue optionally substituted with 1 to 6 substituents R$^a$,
wherein
R$^a$ at each occurrence are independently from each other selected from the group consisting of =O, =C(CN)$_2$, —O—C$_{2-6}$-alkylene-O—, halogen, —CN, —NO$_2$, —OH, C$_{1-30}$-alkoxy, —O—CH$_2$CH$_2$O—C$_{1-30}$-alkyl, —O—COR$^8$, —S—C$_{1-30}$-alkyl, —NH$_2$, —NHR$^8$, —NR$^8$R$^9$, —NH—COR$^8$, —COOH, —COOR$^8$, —CONH$_2$, —CONHR$^8$, —CONR$^8$R$^9$, —CO—H, —COR$^8$, C$_{1-30}$-alkyl optionally substituted with 1 to 6 substituents R$^i$, C$_{2-30}$-alkenyl optionally substituted with 1 to 6 substituents C$_{2-30}$-alkynyl optionally substituted with 1 to 6 substituents R$^i$, C$_{3-10}$-cycloalkyl optionally substituted with 1 to 6 substituents R$^j$, C$_{5-10}$-cycloalkenyl optionally substituted with 1 to 6 substituents R$^j$ and monovalent 3 to 14 membered aliphatic heterocyclic residue optionally substituted with 1 to 6 substituents R$^j$,
wherein
R$^8$ and R$^9$ at each occurrence are independently from each other selected from the group consisting of C$_{1-30}$-alkyl, C$_{2-30}$-alkenyl, C$_{2-30}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue,
R$^i$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{10}$, —S—C$_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, C$_{3-10}$-cycloalkyl, monovalent 3 to 14 membered aliphatic heterocyclic residue, C$_{6-14}$-aryl and monovalent 5 to 14 membered aromatic heterocyclic residue;
R$^j$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{10}$, —S—C$_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, C$_{1-10}$-alkyl, C$_{2-10}$-alkenyl, C$_{2-10}$-alkynyl, C$_{6-14}$-aryl and monovalent 5 to 14 membered aromatic heterocyclic residue;

wherein R$^{10}$ and R$^{11}$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, or G$^1$ and G$^2$ are independently from each other

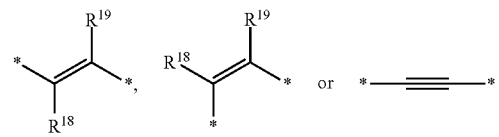

wherein
R$^{18}$ and R$^{19}$ are independently from each other H or C$_{1-30}$-alkyl,
L is C$_{6-24}$-arylene optionally substituted with 1 to 6 substituents R$^b$ or bivalent 5 to 24 membered aromatic heterocyclic residue optionally substituted with 1 to 6 substituents R$^b$,
wherein
R$^b$ at each occurrence are independently from each other selected from the group consisting of =O, =C(CN)$_2$, —O—C$_{2-6}$-alkylene-O—, halogen, —CN, —NO$_2$, —OH, C$_{1-30}$-alkoxy, —O—CH$_2$CH$_2$O—C$_{1-30}$-alkyl, —O—COR$^{12}$, —S—C$_{1-30}$-alkyl, —NH$_2$, —NHR$^{12}$, —NR$^{12}$R$^{13}$, —NH—COR$^{12}$, —COOH, —COOR$^{12}$, —CONH$_2$, —CONHR$^{12}$, —CONR$^{12}$R$^{13}$, —CO—H, —COR$^{12}$, C$_{1-30}$-alkyl optionally substituted with 1 to 6 substituents R$^k$, C$_{2-30}$-alkenyl optionally substituted with 1 to 6 substituents R$^k$, C$_{2-30}$-alkynyl optionally substituted with 1 to 6 substituents R$^k$, C$_{3-10}$-cycloalkyl optionally substituted with 1 to 6 substituents R$^l$, C$_{5-10}$-cycloalkenyl optionally substituted with 1 to 6 substituents R$^l$ and monovalent 3 to 14 membered aliphatic heterocyclic residue optionally substituted with 1 to 6 substituents R$^l$,
wherein
R$^{12}$ and R$^{13}$ at each occurrence are independently from each other selected from the group consisting of C$_{1-30}$-alkyl, C$_{2-30}$-alkenyl, C$_{2-30}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue,
R$^k$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{14}$, —S—C$_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, C$_{3-10}$-cycloalkyl, monovalent 3 to 14 membered aliphatic heterocyclic residue, C$_{6-14}$-aryl and monovalent 5 to 14 membered aromatic heterocyclic residue;
R$^l$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{14}$, —S—C$_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—

H, —COR$^{14}$, C$_{1-10}$-alkyl, C$_{2-10}$-alkenyl, C$_{2-10}$-alkynyl, C$_{6-14}$-aryl and monovalent 5 to 14 membered aromatic heterocyclic residue;

wherein R$^{14}$ and R$^{15}$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, or
L is

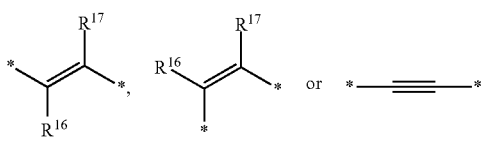

wherein
R$^{16}$ and R$^{17}$ are independently from each other H, C$_{1-30}$-alkyl, —CN or halogen,
q and s are independently from each other 0, 1, 2, 3, 4 or 5,
r is 0, 1 or 2,
and
n is an integer from 2 to 10,000.

C$_{1-10}$-alkyl and C$_{1-30}$-alkyl can be branched or unbranched. Examples of C$_{1-10}$-alkyl are methyl, ethyl, n-propyl, isopropyl, n-butyl, sec-butyl, isobutyl, tert-butyl, n-pentyl, neopentyl, isopentyl, n-(1-ethyl)propyl, n-hexyl, n-heptyl, n-octyl, n-(2-ethyl)hexyl, n-nonyl and n-decyl. Examples of C$_{1-30}$-alkyl are C$_{1-10}$-alkyl, and n-undecyl, n-dodecyl, n-undecyl, n-dodecyl, n-tridecyl, n-tetradecyl, n-pentadecyl, n-hexadecyl, n-heptadecyl, n-octadecyl, n-nonadecyl and n-icosyl (C$_{20}$), n-docosyl (C$_{22}$), n-tetracosyl (C$_{24}$), n-hexacosyl (C$_{26}$), n-octacosyl (C$_{28}$) and n-triacontyl (C$_{30}$).

C$_{2-10}$-alkenyl and C$_{2-30}$-alkenyl can be branched or unbranched. Examples of C$_{2-10}$-alkenyl are vinyl, propenyl, cis-2-butenyl, trans-2-butenyl, 3-butenyl, cis-2-pentenyl, trans-2-pentenyl, cis-3-pentenyl, trans-3-pentenyl, 4-pentenyl, 2-methyl-3-butenyl, hexenyl, heptenyl, octenyl, nonenyl and docenyl. Examples of C$_{2-30}$-alkenyl are C$_{2-10}$-alkenyl, and linoleyl (C$_{18}$), linolenyl (C$_{18}$), oleyl (C$_{18}$), arachidonyl (C$_{20}$), and erucyl (C$_{22}$).

C$_{2-10}$-alkynyl and C$_{2-30}$-alkynyl can be branched or unbranched. Examples of C$_{2-10}$-alkynyl are ethynyl, 2-propynyl, 2-butynyl, 3-butynyl, pentynyl, hexynyl, heptynyl, octynyl, nonynyl and decynyl. Examples of C$_{2-30}$-alkynyl are C$_{2-10}$-alkynyl, and undecynyl, dodecynyl, undecynyl, dodecynyl, tridecynyl, tetradecynyl, pentadecynyl, hexadecynyl, heptadecynyl, octadecynyl, nonadecynyl and icosynyl (C$_{20}$).

Examples of C$_{3-10}$-cycloalkyl are preferably monocyclic C$_{3-10}$-cycloalkyls such as cyclopropyl, cyclobutyl, cyclopentyl, cyclohexyl, cycloheptyl and cyclooctyl, but include also polycyclic C$_{3-10}$-cycloalkyls such as decalinyl, norbornyl and adamantyl.

Examples of C$_{5-10}$-cycloalkenyl are preferably monocyclic C$_{5-10}$-cycloalkenyls such as cyclopentenyl, cyclohexenyl, cyclohexadienyl and cycloheptatrienyl, but include also polycyclic C$_{5-10}$-cycloalkenyls.

Examples of monovalent 3 to 14 membered aliphatic heterocyclic residues are monocyclic monovalent 3 to 8 membered aliphatic cyclic residues and polycyclic, for example bicyclic monovalent 7 to 12 membered aliphatic heterocyclic residues.

Examples of monocyclic monovalent 3 to 8 membered aliphatic heterocyclic residues are monocyclic monovalent 5 membered aliphatic heterocyclic residues containing one heteroatom such as pyrrolidinyl, 1-pyrrolinyl, 2-pyrrolinyl, 3-pyrrolinyl, tetrahydrofuryl, 2,3-dihydrofuryl, tetrahydrothiophenyl and 2,3-dihydrothiophenyl, monocyclic monovalent 5 membered aliphatic heterocyclic residues containing two heteroatoms such as imidazolidinyl, imidazolinyl, pyrazolidinyl, pyrazolinyl, oxazolidinyl, oxazolinyl, isoxazolidinyl, isoxazolinyl, thiazolidinyl, thiazolinyl, isothiazolidinyl and isothiazolinyl, monocyclic monovalent 5 membered aliphatic heterocyclic residues containing three heteroatoms such as 1,2,3-triazolyl, 1,2,4-triazolyl and 1,4,2-dithiazolyl, monocyclic monovalent 6 membered aliphatic heterocyclic residues containing one heteroatom such as piperidyl, piperidino, tetrahydropyranyl, pyranyl, thianyl and thiopyranyl, monocyclic monovalent 6 membered aliphatic heterocyclic residues containing two heteroatoms such as piperazinyl, morpholinyl and morpholino and thiazinyl, monocyclic monovalent 7 membered aliphatic heterocyclic residues containing one hereoatom such as azepanyl, azepinyl, oxepanyl, thiepanyl, thiapanyl, thiepinyl, and monocyclic monovalent 7 membered aliphatic heterocyclic residues containing two hereoatom such as 1,2-diazepinyl and 1,3-thiazepinyl.

An example of a bicyclic monovalent 7-12 membered aliphatic heterocyclic residue is decahydronaphthyl.

C$_{6-14}$-aryl can be monocyclic or polycyclic. Examples of C$_{6-14}$-aryl are monocyclic C$_6$-aryl such as phenyl, bicyclic C$_{9-10}$-aryl such as 1-naphthyl, 2-naphthyl, indenyl, indanyl and tetrahydronaphthyl, and tricyclic C$_{12-14}$-aryl such as anthryl, phenanthryl, fluorenyl and s-indacenyl.

The monovalent 5 to 14 membered aromatic heterocyclic residues can be monocyclic monovalent 5 to 8 membered aromatic heterocyclic residues, or polycyclic, for example bicyclic monovalent 7 to 12 membered, tricyclic monovalent 9 to 14 membered aromatic heterocyclic residue, or tetracyclic monovalent 9 to 14 membered aromatic heterocyclic residues.

Examples of monocyclic monovalent 5 to 8 membered aromatic heterocyclic residues are monocyclic monovalent 5 membered aromatic heterocyclic residues containing one heteroatom such as pyrrolyl, furyl and thiophenyl, monocyclic monovalent 5 membered aromatic heterocyclic residues containing two heteroatoms such as imidazolyl, pyrazolyl, oxazolyl, isoxazolyl, thiazolyl, isothiazolyl, monocyclic monovalent 5 membered aromatic heterocyclic residues containing three heteroatoms such as 1,2,3-triazolyl, 1,2,4-triazolyl and oxadiazolyl, monocyclic monovalent 5 membered aromatic heterocyclic residues containing four heteroatoms such as tetrazolyl, monocyclic monovalent 6 membered aromatic heterocyclic residues containing one heteroatom such as pyridyl, monocyclic monovalent 6 membered aromatic heterocyclic residues containing two heteroatoms such as pyrazinyl, pyrimidinyl and pyridazinyl, monocyclic monovalent 6 membered aromatic heterocyclic residues containing three heteroatoms such as 1,2,3-triazinyl, 1,2,4-triazinyl and 1,3,5-triazinyl, monocyclic monovalent 7 membered aromatic heterocyclic residues containing one heteroatom such as azepinyl, and monocyclic monovalent 7 membered aromatic heterocyclic residues containing two heteroatoms such as 1,2-diazepinyl, Examples of bicyclic monovalent 7 to 12 membered aromatic heterocyclic residues are bicyclic monovalent 8 membered aromatic heterocyclic residues containing two heteroatoms such as thieno[3,2-b]thiophenyl, bicyclic 9 membered aromatic heterocyclic residues containing one heteroatom such as indolyl, isoindolyl, indolizinyl, indolinyl, benzofuryl, isobenzofuryl, benzothiophenyl and isobenzothiophenyl, bicyclic monovalent 9 membered aromatic heterocyclic residues containing two heteroatoms such as indazolyl, benzimidazolyl, benzimidazolinyl, benzoxazolyl, benzisooxazolyl, benzthiazolyl, benzisothiazolyl, furopyridyl and thienopyridyl, bicyclic monovalent 9 membered aromatic heterocyclic residues containing three heteroatoms such as benzotriazolyl, benzoxadiazolyl, oxazolopyridyl, isooxazolopyridyl, thiazolopyridyl, isothiazolopyridyl and imidazopyridyl, bicyclic monovalent 9 membered aromatic heterocyclic residues containing four heteroatoms such as purinyl, bicyclic monovalent 10 membered aromatic heterocyclic residues containing one heteroatom such as quinolyl, isoquinolyl, chromenyl and chromanyl, bicyclic monovalent 10 membered aromatic heterocyclic residues containing two heteroatoms such as quinoxalinyl, quinazolinyl, cinnolinyl, phthalazinyl, 1,5-naphthyridinyl and 1,8-naphthyridinyl, bicyclic monovalent 10 membered aromatic heterocyclic residues containing three heteroatoms such as pyridopyrazinyl, pyridopyrimidinyl and pyridopyridazinyl, and bicyclic monovalent 10 membered aromatic heterocyclic residues containing four heteroatoms such as pteridinyl.

Examples of tricyclic monovalent 9 to 14 membered aromatic heterocyclic residues are dibenzofuryl, acridinyl, phenoxazinyl, 7H-cyclopenta[1,2-b:3,4-b']dithiophenyl and 4H-cyclopenta-[2,1-b:3,4-b']dithiophenyl. An example of a tricyclic monovalent 9 to 14 membered aromatic heterocyclic residue containing three heteroatoms is dithienothiophenyl of formula

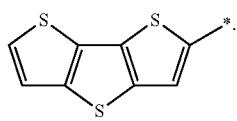

An example of a tetracyclic monovalent 9 to 14 membered aromatic heterocyclic residue containing four heteroatoms is trithienothiophenyl of formula

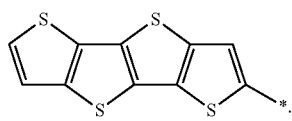

Examples of halogen are —F, —Cl, —Br and —I.

Examples of $C_{1-10}$-alkoxy are methoxy, ethoxy, n-propoxy, isopropoxy, n-butoxy, sec-butoxy, isobutoxy, tert-butoxy, n-pentoxy, neopentoxy, isopentoxy, hexoxy, n-heptoxy, n-octoxy, n-nonoxy and n-decoxy. Examples of $C_{1-30}$-alkoxy are $C_{1-10}$-alkoxy, and n-undecoxy, n-dodecoxy, n-undecoxy, n-dodecoxy, n-tridecoxy, n-tetradecoxy, n-pentadecoxy, n-hexadecoxy, n-heptadecoxy, n-octadecoxy, n-nonadecoxy and n-icosoxy ($C_{20}$), n-docosoxy ($C_{22}$), n-tetracosoxy ($C_{24}$), n-hexacosoxy ($C_{26}$), n-octacosoxy ($C_{28}$) and n-triacontoxy ($C_{30}$).

Examples of $C_{2-6}$-alkylene are ethylene, butylene, pentylene, hexylene and 2-methylpentylene.

Examples of $C_{6-14}$-arylene are monocyclic $C_6$-arylene such as phenylene, bicyclic $C_{9-10}$-arylene such as naphthylene, for example

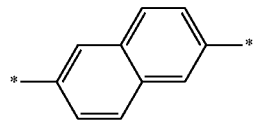 [SMILES: *c1ccc2cc(*)ccc2c1]

indenylene, for example

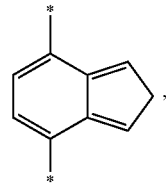 [SMILES: *c1ccc(*)c2c1=CCC=2]

indanylene, for example

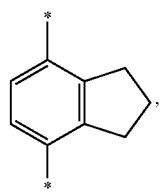

and tetrahydronaphthylene, for example

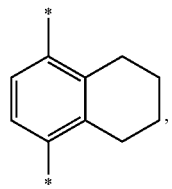 [SMILES: *c1ccc(*)c2c1CCCC2]

and tricyclic $C_{12-14}$-arylene such as anthrylene, for example

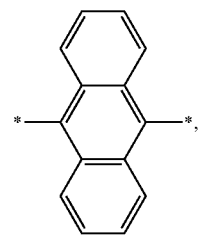

phenanthrylene, for example

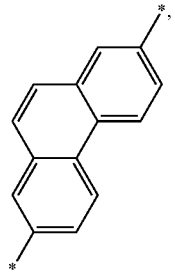

fluorenylene, for example

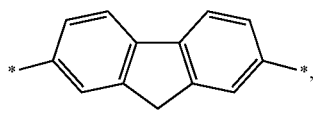

and
s-indacenylene, for example

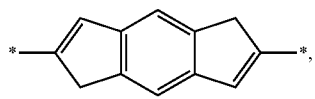

Examples of $C_{6-24}$-arylene are $C_{6-14}$-arylene and pyrenylene, for example

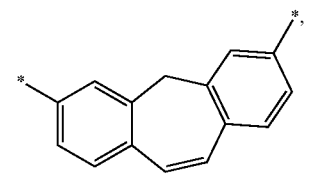

tetracenylene, for example

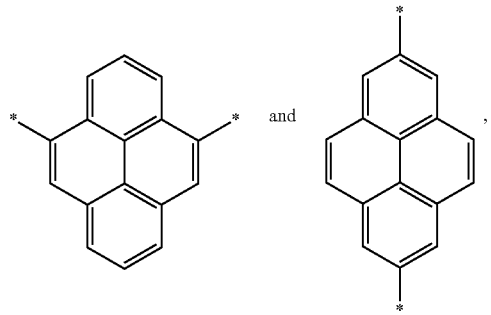 [SMILES: *c1cc2cccc3cc(*)c4cccc1c4c23 ; *c1cc2ccc3cc(*)cc4ccc(c1)c2c34]

perylenylene, for example

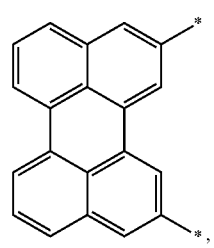 [SMILES: *c1cc2cccc3c4cccc5cc(*)cc(c(c1)c23)c54]

indenofluorenylene, for example

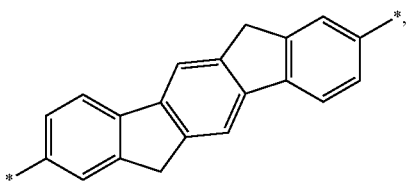

pentacenylene, for example

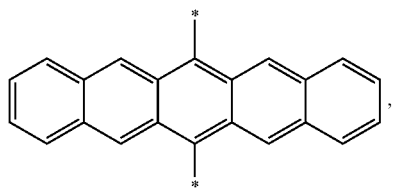 [SMILES: *c1c2cc3ccccc3cc2c(*)c2cc3ccccc3cc12]

coronenylene, for example

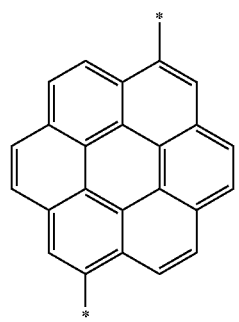 [SMILES: *c1cc2ccc3ccc4c(*)cc5ccc6ccc1c1c6c5c4c3c21]

and tetraphenylenylene, for example

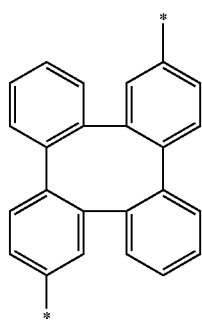

The bivalent 5 to 14 membered aromatic heterocyclic residues can be monocyclic bivalent 5 to 8 membered aromatic heterocyclic residues, or polycyclic, for example bicyclic bivalent 7 to 14 membered, tricyclic bivalent 9 to 14 membered aromatic heterocyclic residues, or tetracyclic bivalent 9 to 14 membered aromatic heterocyclic residues.

Examples of monocyclic bivalent 5 to 8 membered aromatic heterocyclic residues are monocyclic bivalent 5 membered aromatic heterocyclic residues containing one heteroatom such as pyrrolylene, furylene and thiophenylene, monocyclic bivalent 5 membered aromatic heterocyclic residues containing two heteroatoms such as imidazolylene, pyrazolylene, oxazolylene, isoxazolylene, thiazolylene, isothiazolylene, monocyclic bivalent 5 membered aromatic heterocyclic residues containing three heteroatoms such as 1,2,3-triazolylene, 1,2,4-triazolylene and oxadiazolylene, monocyclic bivalent 5 membered aromatic heterocyclic residues containing four heteroatoms such as tetrazolylene, monocyclic bivalent 6 membered aromatic heterocyclic residues containing one heteroatom such as pyridylene, monocyclic bivalent 6 membered aromatic heterocyclic residues containing two heteroatoms such as pyrazinylene, pyrimidinylene and pyridazinylene, monocyclic bivalent 6 membered aromatic heterocyclic residues containing three heteroatoms such as 1,2,3-triazinylene, 1,2,4-triazinylene and 1,3,5-triazinylene, monocyclic bivalent 7 membered aromatic heterocyclic residues containing one heteroatom such as azepinylene, and monocyclic bivalent 7 membered aromatic heterocyclic residues containing two heteroatoms such as 1,2-diazepinylene.

Examples of bicyclic bivalent 7 to 14 membered aromatic heterocyclic residues are bicyclic bivalent 8 membered aromatic heterocyclic residues containing two heteroatoms such as thienothiophenylene, for example

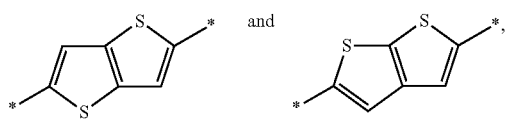

bicyclic bivalent 8 membered aromatic heterocyclic residues containing three heteroatoms such as thienothiazolylene, for example

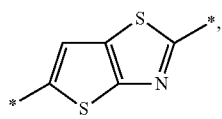

bicyclic bivalent 8 membered aromatic heterocyclic residues containing four heteroatoms such as thiazothiazolylene, for example

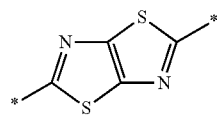 [SMILES: *c1nc2sc(*)nc2s1]

bicyclic bivalent 9 membered aromatic heterocyclic residues containing one heteroatom such as indolylene, isoindolylene, indolizinylene, indolinylene, isoindolinylene, for example

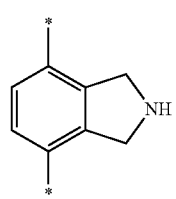 [SMILES: *c1ccc(*)c2c1CNC2]

benzofurylene, isobenzofurylene, benzothiophenylene and isobenzothiophenylene, bicyclic bivalent 9 membered aromatic heterocyclic residues containing two heteroatoms such as indazolylene, benzimidazolylene, benzimidazolinylene, benzoxazolylene, benzisooxazolylene, benzthiazolylene, benzisothiazolylene, furopyridylene and thienopyridylene, bicyclic bivalent 9 membered aromatic heterocyclic residues containing three heteroatoms such as benzotriazolylene, benzoxadiazolylene, oxazolopyridylene, isooxazolopyridylene, thiazolopyridylene, isothiazolopyridylene, imidazopyridylene, benzothiadiazolylene, for example

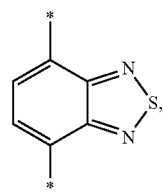 [SMILES: *c1ccc(*)c2nsnc12]

and dioxanothiophenylene, for example

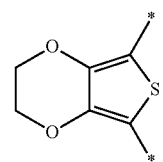 [SMILES: *c1sc(*)c2c1OCCO2]

bicyclic bivalent 9 membered aromatic heterocyclic residues containing four heteroatoms such as purinylene, bicyclic bivalent 10 membered aromatic heterocyclic residues containing one heteroatom such as quinolylene, isoquinolylene, chromenylene and chromanylene, bicyclic bivalent 10 membered aromatic heterocyclic residues containing two heteroatoms such as quinoxalinylene, for example

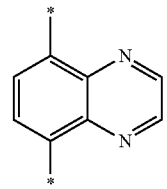 [SMILES: *c1ccc(*)c2nccnc12]

quinazolinylene, cinnolinylene, phthalazinylene, 1,5-naphthyridinylene and 1,8-naphthyridinylene, bicyclic bivalent 10 membered aromatic heterocyclic residues containing three heteroatoms such as pyridopyrazinylene, pyridopyrimidinylene and pyridopyridazinylene, and bicyclic bivalent 10 membered aromatic heterocyclic residues containing four heteroatoms such as pteridinylene.

Examples of tricyclic bivalent 9 to 14 membered aromatic heterocyclic residues containing one heteroatom are dibenzofurylene, acridinylene, dibenzosilacyclopentadienylene, for example

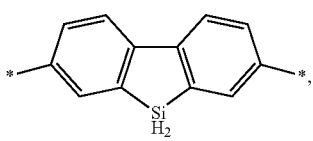

and dibenzopyrrolylene, for example

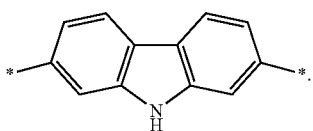

Examples of a tricyclic bivalent 9 to 14 membered aromatic heterocyclic residues containing two heteroatoms are phenoxazinylene, and the following compounds

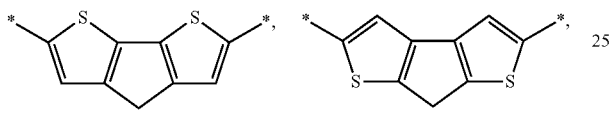

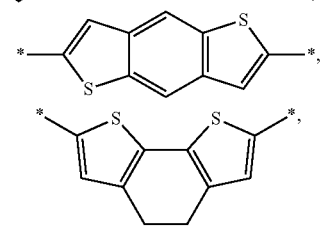

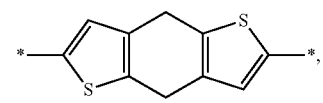

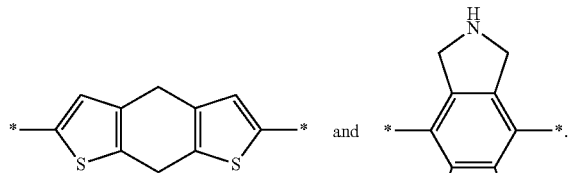

Examples of tricyclic bivalent 9 to 14 membered aromatic heterocyclic residue containing three heteroatoms are the following compounds

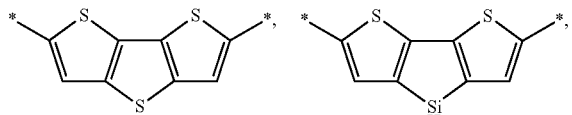

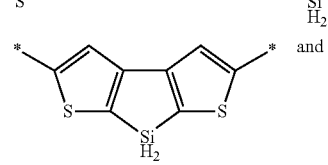

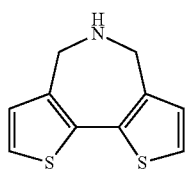

Examples of tricyclic bivalent 9 to 14 membered aromatic heterocyclic residue containing four-heteroatoms are the following compounds

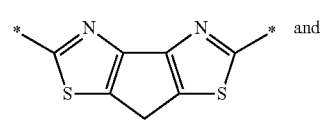

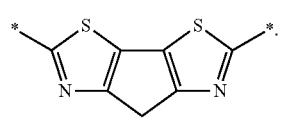

An example of a tricyclic bivalent 9 to 14 membered aromatic heterocyclic residue containing six heteroatoms is the following compound

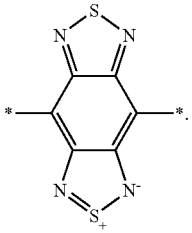

An example of a tetracyclic bivalent 9 to 14 membered aromatic heterocyclic residue containing four heteroatoms is the following compound

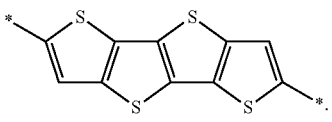

Examples of bivalent 5 to 24 membered aromatic heterocyclic residues are bivalent 5 to 14 membered aromatic heterocyclic residues, and the following compounds

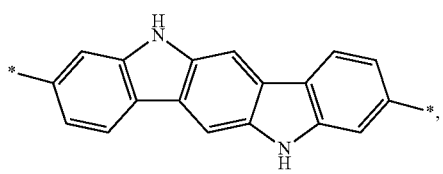

-continued
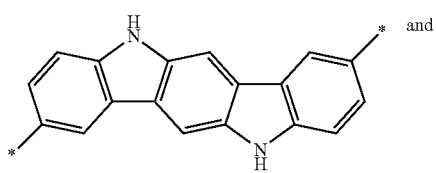 and
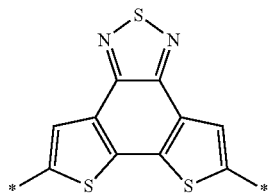
Examples of L are:
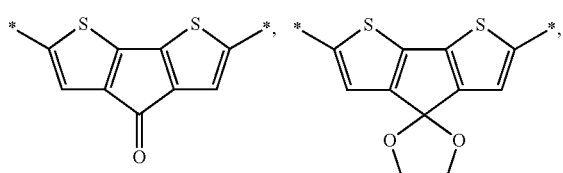
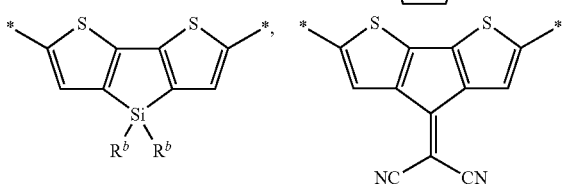
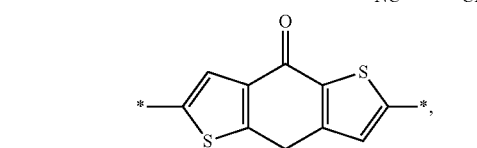
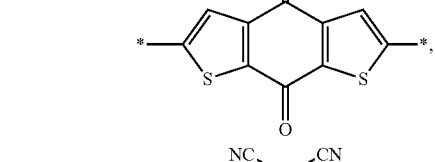
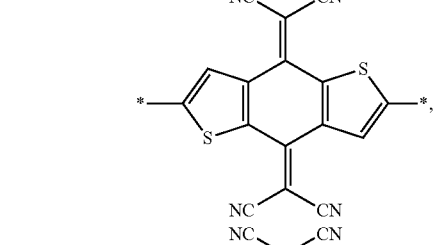
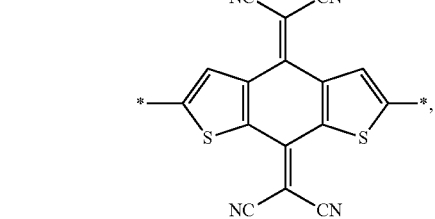
-continued
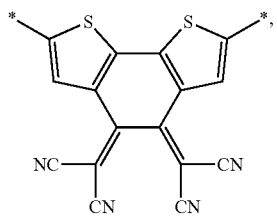
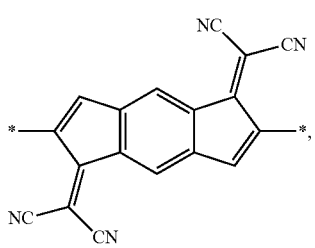
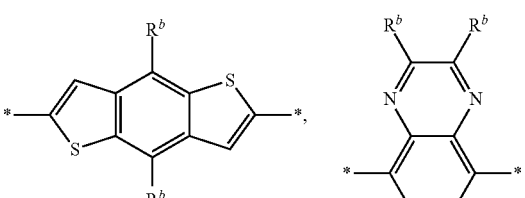
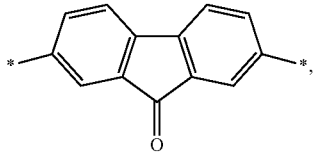
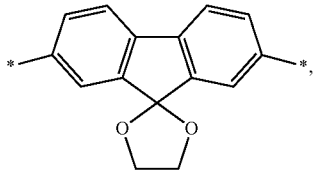
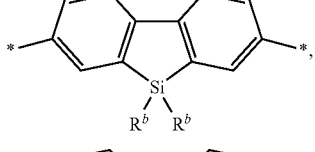
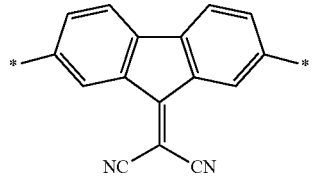
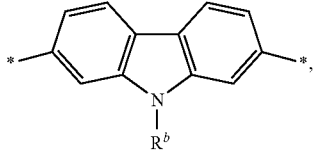
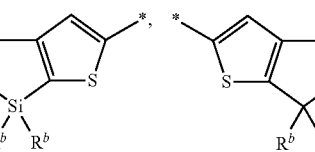

-continued

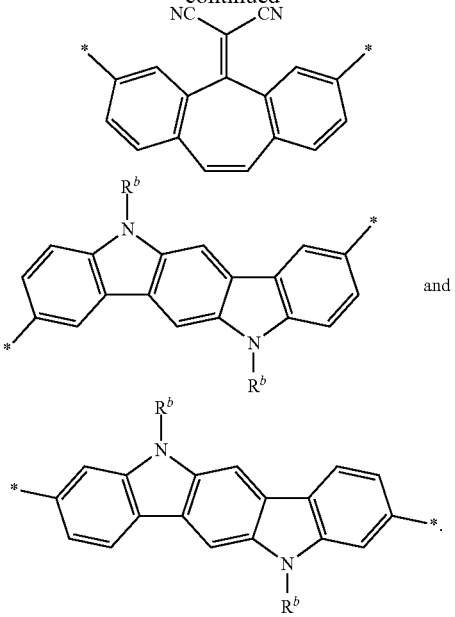

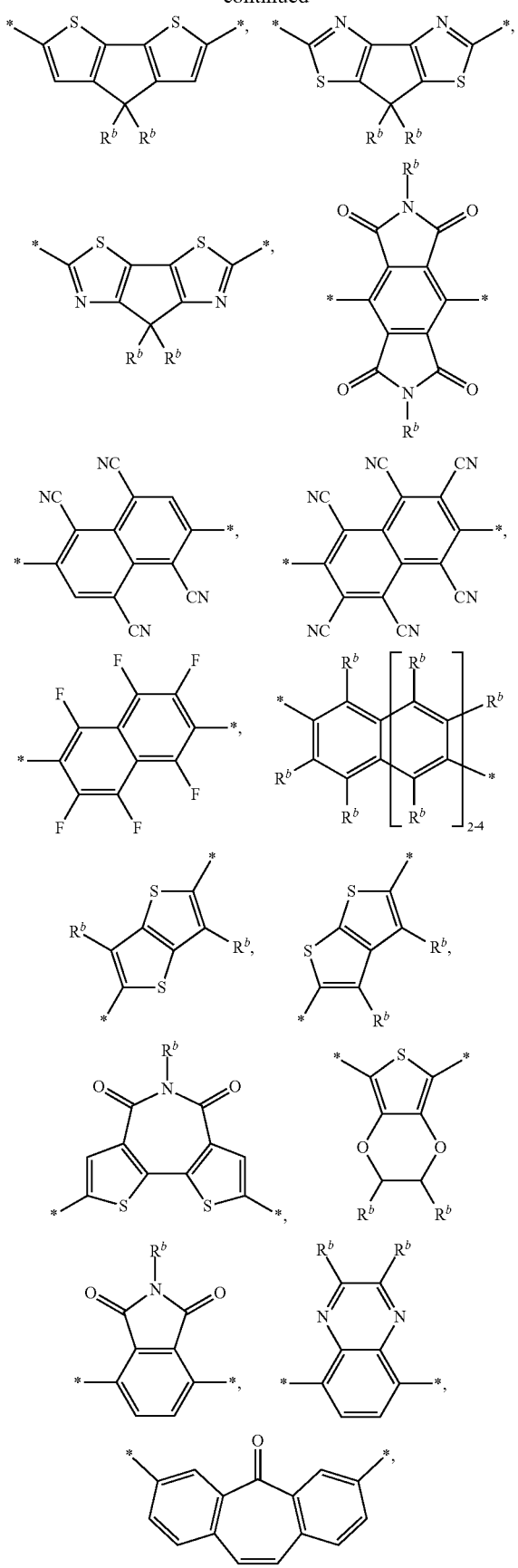

In preferred units of formula (1) and (1')

$R^1$ is H, $C_{1-30}$-alkyl optionally substituted with 1 to 6 substituents $R^c$, $C_{2-30}$-alkenyl optionally substituted with 1 to 6 substituents $R^c$, $C_{2-30}$-alkynyl optionally substituted with 1 to 6 substituents $R^c$, $C_{3-10}$-cycloalkyl optionally substituted with 1 to 6 substituents $R^d$, $C_{5-10}$-cycloalkenyl optionally substituted with 1 to 6 substituents $R^d$ or monovalent 3 to 14 membered aliphatic heterocyclic residue optionally substituted with 1 to 6 substituents $R^d$, wherein $R^c$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^2$, —S—$C_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, $C_{3-10}$-cycloalkyl, monovalent 3 to 14 membered aliphatic heterocyclic residue, $C_{6-14}$-aryl and monovalent 5 to 14 membered aromatic heterocyclic residue;

$R^d$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^2$, —S—$C_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, $C_{2-10}$-alkenyl, $C_{2-10}$-alkynyl, $C_{6-14}$-aryl and monovalent 5 to 14 membered aromatic heterocyclic residue;

wherein $R^2$ and $R^3$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, X is C—$R^4$,
wherein
$R^4$ is H, $C_{1-30}$-alkyl optionally substituted with 1 to 6 substituents $R^f$, $C_{2-30}$-alkenyl optionally substituted with 1 to 6 substituents $R^f$, $C_{2-30}$-alkynyl optionally substituted with 1 to 6 substituents $R^f$, $C_{3-10}$-cycloalkyl optionally substituted with 1 to 6 substituents $R^g$, $C_{5-10}$-cycloalkenyl optionally substituted with 1 to 6 substituents $R^g$ or monovalent 3 to 14 membered aliphatic heterocyclic residue optionally substituted with 1 to 6 substituents $R^g$,
wherein
$R^f$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^5$, —S—$C_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, $C_{3-10}$-cycloalkyl, monovalent 3 to 14 membered aliphatic heterocyclic residue, $C_{6-14}$-aryl and monovalent 5 to 14 membered aromatic heterocyclic residue;
$R^g$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^5$, —S—$C_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, $C_{1-10}$-alkyl, $C_{2-10}$-alkenyl, $C_{2-10}$-alkynyl, $C_{6-14}$-aryl and monovalent 5 to 14 membered aromatic heterocyclic residue;
wherein $R^5$ and $R^6$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, $G^1$ and $G^2$ are independently from each other $C_{6-14}$-arylene optionally substituted with 1 to 6 substituents $R^a$ or bivalent 5 to 14 membered aromatic heterocyclic residue optionally substituted with 1 to 6 substituents $R^a$,
wherein
$R^a$ at each occurrence are independently from each other selected from the group consisting of =O, =C(CN)$_2$, —O—$C_{2-6}$-alkylene-O—, halogen, —CN, —NO$_2$, —OH, $C_{1-30}$-alkoxy, —O—CH$_2$CH$_2$O—$C_{1-30}$-alkyl, —O—COR$^8$, —S—$C_{1-30}$-alkyl, —NH$_2$, —NHR$^8$, —NR$^8$R$^9$, —NH—COR$^8$, —COOH, —COOR$^8$, —CONH$_2$, —CONHR$^8$, —CONR$^8$R$^9$, —CO—H, —COR$^8$, $C_{1-30}$-alkyl optionally substituted with 1 to 6 substituents $R^i$, $C_{2-30}$-alkenyl optionally substituted with 1 to 6 substituents $R^i$, $C_{2-30}$-alkynyl optionally substituted with 1 to 6 substituents $R^i$, $C_{3-10}$-cycloalkyl optionally substituted with 1 to 6 substituents $R^j$, $C_{5-10}$-cycloalkenyl optionally substituted with 1 to 6 substituents $R^j$ and monovalent 3 to 14 membered aliphatic heterocyclic residue optionally substituted with 1 to 6 substituents $R^j$,
wherein
$R^8$ and $R^9$ at each occurrence are independently from each other selected from the group consisting of $C_{1-30}$-alkyl, $C_{2-30}$-alkenyl, $C_{2-30}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue,
$R^i$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^{10}$, —S—$C_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, $C_{3-10}$-cycloalkyl, monovalent 3 to 14 membered aliphatic heterocyclic residue, $C_{6-14}$-aryl and monovalent 5 to 14 membered aromatic heterocyclic residue;
$R^j$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^{10}$, —S—$C_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, $C_{1-10}$-alkyl, $C_{2-10}$-alkenyl, $C_{2-10}$-alkynyl, $C_{6-14}$-aryl and monovalent 5 to 14 membered aromatic heterocyclic residue;
wherein $R^{10}$ and $R^{11}$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, or
$G^1$ and $G^2$ are independently from each other

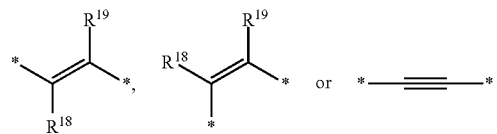

wherein
$R^{18}$ and $R^{19}$ are independently from each other H or $C_{1-30}$-alkyl,
L is $C_{6-24}$-arylene optionally substituted with 1 to 6 substituents RD or bivalent 5 to 24 membered aromatic heterocyclic residue optionally substituted with 1 to 6 substituents $R^b$,
wherein
$R^b$ at each occurrence are independently from each other selected from the group consisting of =O, =C(CN)$_2$, —O—$C_{2-6}$-alkylene-O—, halogen, —CN, —NO$_2$, —OH, $C_{1-30}$-alkoxy, —O—CH$_2$CH$_2$O—$C_{1-30}$-alkyl, —O—COR$^{12}$, —S—$C_{1-30}$-alkyl, —NH$_2$, —NHR$^{12}$, —NR$^{12}$R$^{13}$, —NH—COR$^{12}$, —COOH, —COOR$^{12}$, —CONH$_2$, —CONHR$^{12}$, —CONR$^{12}$R$^{13}$, —CO—H, —COR$^{12}$, $C_{1-30}$-alkyl optionally substituted with 1 to 6 substituents $R^k$, $C_{2-30}$-alkenyl optionally substituted with 1 to 6 substituents $R^k$, $C_{2-30}$-alkynyl optionally substituted with 1 to 6 substituents $R^k$, $C_{3-10}$-cycloalkyl optionally substituted with 1 to 6 substituents $R^l$, $C_{5-10}$-cycloalkenyl optionally substituted with 1 to 6 substituents $R^l$ and monovalent 3 to 14 membered aliphatic heterocyclic residue optionally substituted with 1 to 6 substituents $R^l$, wherein
$R^{12}$ and $R^{13}$ at each occurrence are independently from each other selected from the group consisting of $C_{1-30}$-alkyl, $C_{2-30}$-alkenyl, $C_{2-30}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, $R^k$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^{14}$, —S—$C_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, $C_{3-10}$-cycloalkyl, monovalent 3 to 14 membered aliphatic heterocyclic residue, $C_{6-14}$-aryl and monovalent 5 to 14 membered aromatic heterocyclic residue;

$R^l$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^{14}$, —S—$C_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, $C_{1-10}$-alkyl, $C_{2-10}$-alkenyl, $C_{2-10}$-alkynyl, $C_{6-14}$-aryl and monovalent 5 to 14 membered aromatic heterocyclic residue;
wherein $R^{14}$ and $R^{15}$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, or
L is

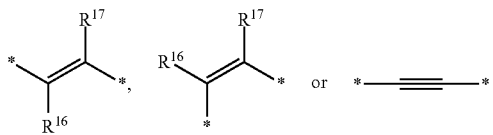

wherein
$R^{16}$ and $R^{17}$ are independently from each other H or $C_{1-30}$-alkyl,
q and s are independently from each other 0, 1, 2, 3, 4 or 5,
r is 0, 1 or 2,
and
n is an integer from 5 to 10,000.

In more preferred units of formula (1) and (1')
$R^1$ is H or $C_{1-30}$-alkyl optionally substituted with 1 to 6 substituents $R^c$,
wherein
$R^c$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^2$, —S—$C_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, $C_{3-10}$-cycloalkyl, monovalent 3 to 14 membered aliphatic heterocyclic residue, $C_{6-14}$-aryl and monovalent 5 to 14 membered aromatic heterocyclic residue;

wherein $R^2$ and $R^3$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, X is C—R$^4$,
wherein
$R^4$ is H or $C_{1-30}$-alkyl optionally substituted with 1 to 6 substituents
wherein
$R^f$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^5$, —S—$C_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, $C_{3-10}$-cycloalkyl, monovalent 3 to 14 membered aliphatic heterocyclic residue, $C_{6-14}$-aryl and monovalent 5 to 14 membered aromatic heterocyclic residue;
wherein $R^5$ and $R^6$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, $G^1$ and $G^2$ are independently from each other $C_{6-14}$-arylene optionally substituted with 1 to 6 substituents $R^a$ or bivalent 5 to 14 membered aromatic heterocyclic residue optionally substituted with 1 to 6 substituents $R^a$,
wherein
$R^a$ at each occurrence are independently from each other selected from the group consisting of =O, =C(CN)$_2$, —O—$C_{2-6}$-alkylene-O—, halogen, —CN, —NO$_2$, —OH, $C_{1-30}$-alkoxy, —O—CH$_2$CH$_2$O—$C_{1-30}$-alkyl, —O—COR$^8$, —S—$C_{1-30}$-alkyl, —NH$_2$, —NHR$^8$, —NR$^8$R$^9$, —NH—COR$^8$, —COOH, —COOR$^8$, —CONH$_2$, —CONHR$^8$, —CONR$^8$R$^9$, —CO—H, —COR$^8$, $C_{1-30}$-alkyl optionally substituted with 1 to 6 substituents $R^i$, $C_{2-30}$-alkenyl optionally substituted with 1 to 6 substituents $R^i$, $C_{2-30}$-alkynyl optionally substituted with 1 to 6 substituents $R^i$, $C_{3-10}$-cycloalkyl optionally substituted with 1 to 6 substituents $R^j$, $C_{5-10}$-cycloalkenyl optionally substituted with 1 to 6 substituents $R^j$ and monovalent 3 to 14 membered aliphatic heterocyclic residue optionally substituted with 1 to 6 substituents
wherein
$R^8$ and $R^9$ at each occurrence are independently from each other selected from the group consisting of $C_{1-30}$-alkyl, $C_{2-30}$-alkenyl, $C_{2-30}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue,
$R^i$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^{10}$, —S—$C_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, C$_{3-10}$-cycloalkyl, monovalent 3 to 14 membered aliphatic heterocyclic residue, C$_{6-14}$-aryl and monovalent 5 to 14 membered aromatic heterocyclic residue;

R$^j$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{10}$, —S—C$_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, C$_{1-10}$-alkyl, C$_{2-10}$-alkenyl, C$_{2-10}$-alkynyl, C$_{6-14}$-aryl and monovalent 5 to 14 membered aromatic heterocyclic residue;

wherein R$^{10}$ and R$^{11}$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, or G$^1$ and G$^2$ are independently from each other

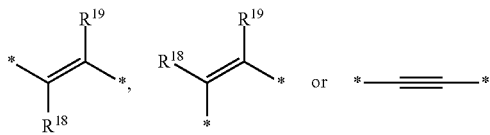

wherein
R$^{18}$ and R$^{19}$ are independently from each other H or C$_{1-30}$-alkyl, L is C$_{6-24}$-arylene optionally substituted with 1 to 6 substituents R$^b$ or bivalent 5 to 24 membered aromatic heterocyclic residue optionally substituted with 1 to 6 substituents R$^b$, wherein R$^b$ at each occurrence are independently from each other selected from the group consisting of =O, =C(CN)$_2$, —O—C$_{2-6}$-alkylene-O—, halogen, —CN, —NO$_2$, —OH, C$_{1-30}$-alkoxy, —O—CH$_2$CH$_2$O—C$_{1-30}$-alkyl, —O—COR$^{12}$, —S—C$_{1-30}$-alkyl, —NH$_2$, —NHR$^{12}$, —NR$^{12}$R$^{13}$, —NH—COR$^{12}$, —COOH, —COOR$^{12}$, —CONH$_2$, —CONHR$^{12}$, —CONR$^{12}$R$^{13}$, —CO—H, —COR$^{12}$, C$_{1-30}$-alkyl optionally substituted with 1 to 6 substituents R$^k$, C$_{2-30}$-alkenyl optionally substituted with 1 to 6 substituents R$^k$, C$_{2-30}$-alkynyl optionally substituted with 1 to 6 substituents R$^k$, C$_{3-10}$-cycloalkyl optionally substituted with 1 to 6 substituents R$^l$, C$_{5-10}$-cycloalkenyl optionally substituted with 1 to 6 substituents R$^l$ and monovalent 3 to 14 membered aliphatic heterocyclic residue optionally substituted with 1 to 6 substituents R$^l$, wherein
R$^{12}$ and R$^{13}$ at each occurrence are independently from each other selected from the group consisting of C$_{1-30}$-alkyl, C$_{2-30}$-alkenyl, C$_{2-30}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, R$^k$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{14}$, —S—C$_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, C$_{3-10}$-cycloalkyl, monovalent 3 to 14 membered aliphatic heterocyclic residue, C$_{6-14}$-aryl and monovalent 5 to 14 membered aromatic heterocyclic residue;

R$^l$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{14}$, —S—C$_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, C$_{2-10}$-alkenyl, C$_{2-10}$-alkynyl, C$_{6-14}$-aryl and monovalent 5 to 14 membered aromatic heterocyclic residue;

wherein R$^{14}$ and R$^{15}$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, or L is

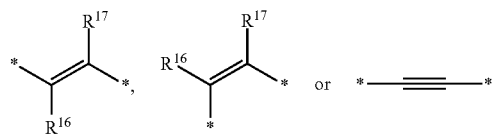

wherein
R$^{16}$ and R$^{17}$ are independently from each other H or C$_{1-30}$-alkyl, q and s are independently from each other 0, 1, 2, 3, 4 or 5,
r is 0, 1 or 2,
and
n is an integer from 5 to 10,000.

In even more preferred units of formula (1) and (1')
R$^1$ is C$_{1-30}$-alkyl optionally substituted with 1 to 6 substituents R$^c$,
wherein
R$^c$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{3-10}$-cycloalkyl, monovalent 3 to 14 membered aliphatic heterocyclic residue, C$_{6-14}$-aryl and monovalent 5 to 14 membered aromatic heterocyclic residue;

wherein R$^2$ and R$^3$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, X is C—$R^4$,
  wherein
    $R^4$ is H or $C_{1-30}$-alkyl optionally substituted with 1 to 6 substituents $R^f$,
      wherein
        $R^f$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —S—$C_{1-10}$-alkyl, —NH$_2$, —NHR$^5$, —NR$^5$R$^6$, —NH—COR$^5$, —COOH, —COOR$^5$, —CONH$_2$, —CONHR$^6$, —CONR$^5$R$^6$, —CO—H, —COR$^5$, $C_{3-10}$-cycloalkyl, monovalent 3 to 14 membered aliphatic heterocyclic residue, $C_{6-14}$-aryl and monovalent 5 to 14 membered aromatic heterocyclic residue;
          wherein $R^5$ and $R^6$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue,
$G^1$ and $G^2$ are independently from each other monocyclic bivalent 5 to 8 membered aromatic heterocyclic residue optionally substituted with 1 to 4 substituents $R^a$,
  wherein
    $R^a$ at each occurrence are independently from each other selected from the group consisting of =O, =C(CN)$_2$, —O—$C_{2-6}$-alkylene-O—, halogen, —CN, —NO$_2$, —OH, $C_{1-30}$-alkoxy, —O—CH$_2$CH$_2$O—$C_{1-30}$-alkyl, —O—COR$^8$, —S—$C_{1-30}$-alkyl, —NH$_2$, —NHR$^8$, —NR$^8$R$^9$, —NH—COR$^8$, —COOH, —COOR$^8$, —CONH$_2$, —CONHR$^8$, —CONR$^8$R$^9$, —CO—H, —COR$^8$, $C_{1-30}$-alkyl optionally substituted with 1 to 6 substituents $R^i$, $C_{2-30}$-alkenyl optionally substituted with 1 to 6 substituents $R^i$, $C_{2-30}$-alkynyl optionally substituted with 1 to 6 substituents $R^i$, $C_{3-10}$-cycloalkyl optionally substituted with 1 to 6 substituents $R^j$, $C_{5-10}$-cycloalkenyl optionally substituted with 1 to 6 substituents $R^j$ and monovalent 3 to 14 membered aliphatic heterocyclic residue optionally substituted with 1 to 6 substituents $R^j$,
      wherein
        $R^8$ and $R^9$ at each occurrence are independently from each other selected from the group consisting of $C_{1-30}$-alkyl, $C_{2-30}$-alkenyl, $C_{2-30}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue,
        $R^i$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^{10}$, —S—$C_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, $C_{3-10}$-cycloalkyl, monovalent 3 to 14 membered aliphatic heterocyclic residue, $C_{6-14}$-aryl and monovalent 5 to 14 membered aromatic heterocyclic residue;
        $R^j$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —CH$_2$CH$_2$O—$C_{1-10}$-alkyl, —O—COR$^{10}$, —S—$C_{1-10}$-alkyl, —NH$_2$, —NHR$^{10}$, —NR$^{10}$R$^{11}$, —NH—COR$^{10}$, —COOH, —COOR$^{10}$, —CONH$_2$, —CONHR$^{10}$, —CONR$^{10}$R$^{11}$, —CO—H, —COR$^{10}$, $C_{1-10}$-alkyl, $C_{2-10}$-alkenyl, $C_{2-10}$-alkynyl, $C_{6-14}$-aryl and monovalent 5 to 14 membered aromatic heterocyclic residue;
          wherein $R^{10}$ and $R^{11}$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue,
L is monocyclic bivalent 5 to 8 membered aromatic heterocyclic residue optionally substituted with 1 to 4 substituents $R^b$,
  wherein
    $R^b$ at each occurrence are independently from each other selected from the group consisting of =O, =C(CN)$_2$, —O—$C_{2-6}$-alkylene-O—, halogen, —CN, —NO$_2$, —OH, $C_{1-30}$-alkoxy, —O—CH$_2$CH$_2$O—$C_{1-30}$-alkyl, —O—COR$^{12}$, —S—$C_{1-30}$-alkyl, —NH$_2$, —NHR$^{12}$, —NR$^{12}$R$^{13}$, —NH—COR$^{12}$, —COOH, —COOR$^{12}$, —CONH$_2$, —CONHR$^{12}$, —CONR$^{12}$R$^{13}$, —CO—H, —COR$^{12}$, $C_{1-30}$-alkyl optionally substituted with 1 to 6 substituents $R^k$, $C_{2-30}$-alkenyl optionally substituted with 1 to 6 substituents $R^k$, $C_{2-30}$-alkynyl optionally substituted with 1 to 6 substituents $R^k$, $C_{3-10}$-cycloalkyl optionally substituted with 1 to 6 substituents $R^l$, $C_{5-10}$-cycloalkenyl optionally substituted with 1 to 6 substituents $R^l$ and monovalent 3 to 14 membered aliphatic heterocyclic residue optionally substituted with 1 to 6 substituents
    wherein
      $R^{12}$ and $R^{13}$ at each occurrence are independently from each other selected from the group consisting of $C_{1-30}$-alkyl, $C_{2-30}$-alkenyl, $C_{2-30}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue,
      $R^k$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^{14}$, —S—$C_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, $C_{3-10}$-cycloalkyl, monovalent 3 to 14 membered aliphatic heterocyclic residue, $C_{6-14}$-aryl and monovalent 5 to 14 membered aromatic heterocyclic residue;
      $R^l$ at each occurrence are independently from each other selected from the group consisting of =O, =C(CN)$_2$, —O—$C_{2-6}$-alkylene-O—, halogen, —CN, —NO$_2$, —OH, $C_{1-10}$-alkoxy, —O—CH$_2$CH$_2$O—$C_{1-10}$-alkyl, —O—COR$^{14}$, —S—$C_{1-10}$-alkyl, —NH$_2$, —NHR$^{14}$, —NR$^{14}$R$^{15}$, —NH—COR$^{14}$, —COOH, —COOR$^{14}$, —CONH$_2$, —CONHR$^{14}$, —CONR$^{14}$R$^{15}$, —CO—H, —COR$^{14}$, $C_{2-10}$-alkenyl, $C_{2-10}$-alkynyl, $C_{6-14}$-aryl and monovalent 5 to 14 membered aromatic heterocyclic residue;
        wherein $R^{14}$ and $R^{15}$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, or L is

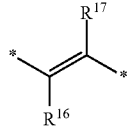

wherein
R[16] and R[17] are independently from each other H or $C_{1-30}$-alkyl,
q and s are independently from each other 0, 1, 2, 3, 4 or 5,
r is 0, 1 or 2,
and
n is an integer from 5 to 10,000.

In most preferred units of formula (1) and (1')
R[1] is $C_{1-30}$-alkyl
X is C—R[4],
wherein
R[4] is H,
G[1] and G[2] are independently from each other monocyclic bivalent 5 to 8 membered aromatic heterocyclic residue optionally substituted with 1 to 4 substituents R[a],
wherein
R[a] at each occurrence are independently from each other $C_{1-30}$-alkyl,
L is monocyclic bivalent 5 to 8 membered aromatic heterocyclic residue optionally substituted with 1 to 4 substituents R[b],
wherein
R[b] at each occurrence are independently from each other $C_{1-30}$-alkyl
or
L is

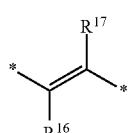

wherein
R[16] and R[17] are both H,
q and s are both 1,
r is 1,
and
n is an integer from 5 to 10,000.

A particular preferred unit of formula (1) is the unit of formula (1a)

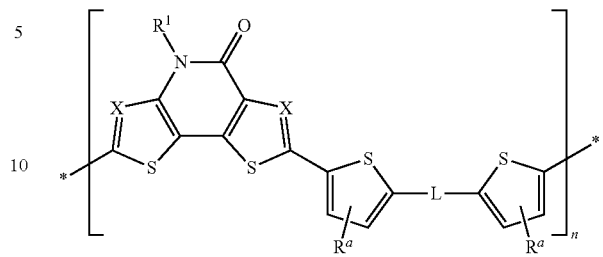

wherein R[1], X, R[a], L and n are as defined above.

A particular preferred unit of formula (1') is the unit of formula (1'a)

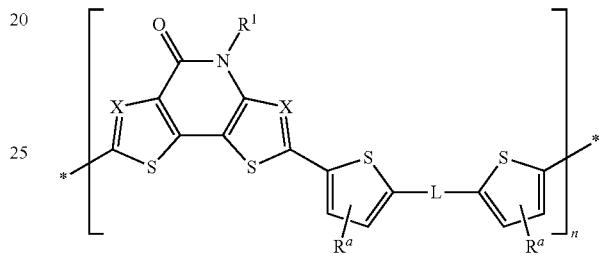

wherein R[1], X, R[a], L and n are as defined above.

In particular preferred units of formula (1a), (1'), (1a) and (1'a)

L is

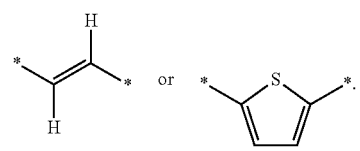

Preferably, n is an integer from 5 to 5,000, more preferably from 5 to 1,000, even more preferably from 5 to 100, and most preferably from 10 to 100.

Particular preferred examples of units of formulae (1) and (1a) are the units of formula (1b)

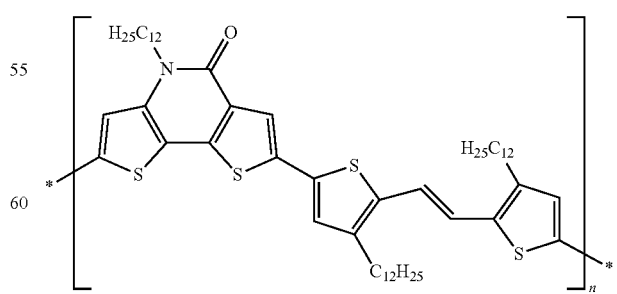

wherein n is an integer from 10 to 1000, preferably from 10 to 100, and

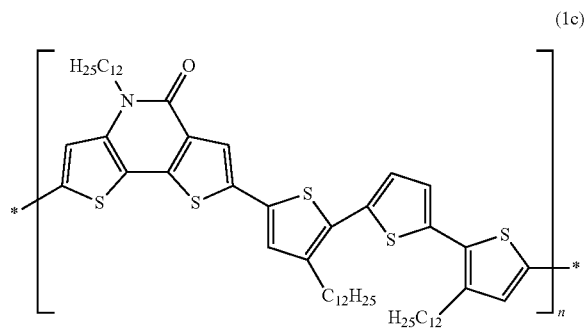

(1c)

wherein n is an integer from 10 to 1000, preferably from 10 to 100.

Particular preferred examples of units of formulae (1') and (1'a) are the units of formula

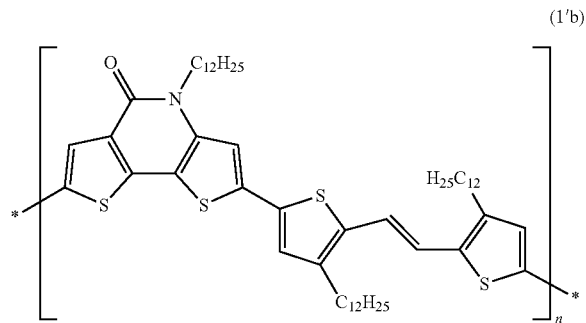

(1'b)

wherein n is an integer from 10 to 1000, preferably from 10 to 100,
and

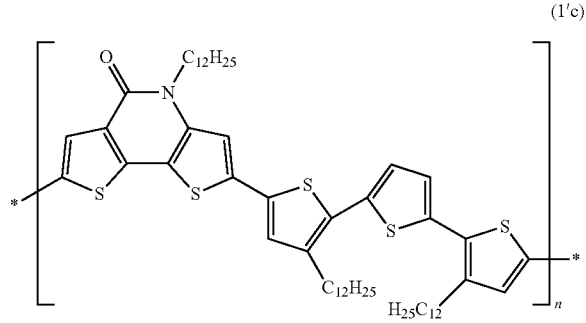

(1'c)

wherein n is an integer from 10 to 1000, preferably from 10 to 100.

The semiconducting material of the present invention can be a polymer comprising preferably at least 80% by weight, more preferably at least 90% by weight, of a unit of formula (1) and/or (1'), respectively, (1a) and/or (1'a) based on the weight of the polymer.

Most preferably, the semiconducting material of the present invention is a polymer consisting essentially of a unit of formula (1) and/or (1'), respectively, (1a) and/or (1'a).

The polymer comprising a unit of formula (1) and/or (1') can be prepared by methods known in the art.

The polymer comprising a unit of formula (1) and/or (1') can, for example, be prepared by treating a compound of formula

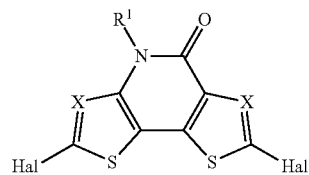

(2)

wherein $R^1$ and X are as defined above, and Hal is halogen, preferably —Br, with a compound of formula

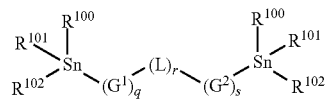

(3)

wherein $G^1$, $G^2$, L, q, r and s are as defined above, and $R^{100}$, $R^{101}$ and $R^{102}$ are independently from each other $C_{1-10}$-alkyl, preferably methyl, in the presence of transition metal catalyst 1.

Transition metal catalyst 1 is preferably a palladium catalyst such tris(dibenzylideneacetone)dipalladium(0), preferably in combination with a phosphine such as tri-o-tolylphosphine. The reaction is preferably performed at elevated temperatures such 80 to 200° C., preferably 90 to 150° C. The reaction can be performed in an inert organic solvent such as chlorobenzene. The reaction can be stopped by the addition of end cappers such as 2-bromothiophene and 2-tributylstannylthiophene. The crude product may be worked up by conventional methods, for example by extracting the crude product with an appropriate solvent, for example with acetone.

The compound of formula (2) can be prepared by treating a compound of formula

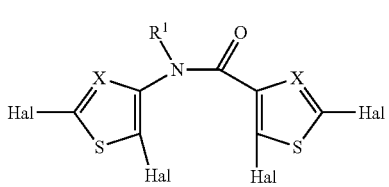

(4)

wherein $R^1$, X and Hal are as defined above, with transition metal catalyst 2.

Transition metal catalyst 2 is preferably copper. The reaction is preferably performed at elevated temperatures such 80 to 150° C., preferably 100 to 120° C. The reaction can be performed in an inert organic solvent such as dimethylformamide. The crude product may be worked up by conventional methods, for example by extracting the crude product with an appropriate solvent, for example with diethylether.

The compound of formula (4) can be prepared by treating a compound of formula

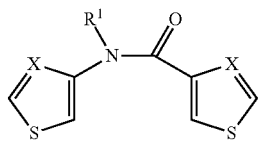

(5)

wherein R¹ and X are as defined above,
with a halogenating agent

The halogenating agent is preferably N-bromosuccinimide. The reaction is preferably performed at slightly elevated temperatures such 35 to 80° C., preferably 40 to 60° C. The reaction can be performed in an organic solvent such chloroform/acetic acid. The crude product may be worked up by conventional methods, for example by extracting the crude product with an appropriate solvent, for example with dichloromethane.

The compound of formula (5) can be prepared by reacting a compound of formula

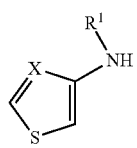

(6)

wherein R¹ and X are as defined above,
with a compound of formula

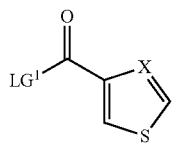

(7)

wherein X is as defined above, and $LG^1$ is a leaving group, preferably —Cl,
in the presence of a base.

The base is preferably a tertiary amine such as triethylamine. The reaction is preferably performed at slightly elevated temperatures such 35 to 80° C., preferably at 40 to 60° C. The reaction can be performed in an organic solvent such chloroform/acetic acid. The crude product may be worked up by conventional methods, for example by extracting the crude product with an appropriate solvent, for example with dichloromethane.

The compounds of formulae (2), (4) and (5) are also part of the invention.

Also part of the present invention is an electronic device comprising the polymer comprising a unit of formula (1) and/or (1') as semiconducting material. Preferably, the electronic device is an organic field effect transistor (OFET), and in particular a thin film transistor (TFT). Preferably, the electronic device is an organic photovoltaic device (OPV).

Usually, an organic field effect transistor comprises a dielectric layer, a semiconducting layer and a substrate. In addition, an organic field effect transistor usually comprises a gate electrode and source/drain electrodes.

An organic field effect transistor can have various designs. The most common design of a field-effect transistor is the Bottom-Gate Top-Contact (BGTC) design. Here, the gate is on top of the substrate and at the bottom of the dielectric layer, the semiconducting layer is at the top of the dielectric layer and the source/drain electrodes are on top of the semiconducting layer.

Another design of a field-effect transistor is the Top-Gate Bottom-Contact (TGBC) design. Here, the source/drain electrodes are on top of the substrate and at the bottom of the semiconducting layer, the dielectric layer is on top of the semiconducting layer and the gate electrode is on top of the dielectric layer.

The semiconducting layer comprises the semiconducting material of the present invention. The semiconducting layer can have a thickness of 5 to 500 nm, preferably of 10 to 100 nm, more preferably of 20 to 50 nm.

The dielectric layer comprises a dielectric material. The dielectric material can be silicium/silicium dioxide, or, preferably, an organic polymer such as polystyrene (PS), poly(methylmethacrylate) (PMMA), poly(4-vinylphenol) (PVP), poly(vinyl alcohol) (PVA), anzocyclobutene (BCB), or polyimide (PI). The dielectric layer can have a thickness of 10 to 2000 nm, preferably of 50 to 1000 nm, more preferably of 100 to 800 nm.

The source/drain contacts and the gate contact can be made from any suitable material, for example Au.

The substrate can be any suitable substrate such as glass, or a plastic substrate. Preferably the substrate is a plastic substrate such as polyethersulfone, polycarbonate, polysulfone, polyethylene terephthalate (PET) and polyethylene naphthalate (PEN). More preferably, the plastic substrate is a plastic foil.

The organic field effect transistor can be prepared by methods known in the art.

For example, a top-gate bottom-contact (TGBC) thin film transistors (TFTs) can be prepared as follows: first: the source/drain contacts are placed on the substrate, for example by thermal evaporation of the source/drain material; second: the substrate is coated with the semiconducting layer, for example by spin-coating a solution of the semiconducting material in a suitable solvent and drying the semiconducting layer at elevated temperatures, for example at 80 to 100° C.; third: the semiconducting layer is coated with a solution of the dielectric material in a suitable solvent, for example by spin-coating a solution of the dielectric material and drying the dielectric layer at elevated temperatures, for example at 80 to 100° C.; fourth: the gate contact is placed on top of the dielectric layer, for example by thermal evaporation of the gate material.

Also part of the present invention is the use of the polymer comprising the unit of formula (1) and/or (1') as semiconducting material.

Electronic devices comprising the semiconducting materials of the present invention show high charge carrier mobility as well as high stability, in particular towards oxidation by air, under ambient environmental conditions.

In addition, the semiconducting materials of the present invention are compatible with liquid processing techniques such as spin coating and thus allow the production of low cost, light weight and flexible electronic devices.

EXAMPLES

All reagents are purchased from commercial sources and used without further purification unless otherwise noted.

Conventional Schlenk techniques are used, and reactions are carried out under $N_2$ unless otherwise noted. NMR spectra are recorded on a Varian 400MR spectrometer ($^1$H, 400 MHz). Polymer molecular weights are determined on Agilent 1200 series with refractive index detector in THF at room temperature versus polystyrene standards.

Example 1

Preparation of 3-dodecylaminothiophene (6a)

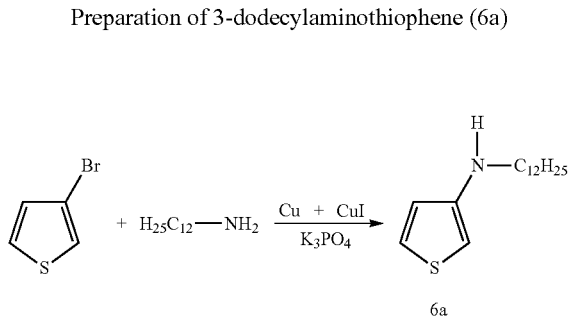

A mixture of 3-bromothiophene (7.20 g, 44.16 mmol), dodecylamine (12.28 g, 166.24 mmol), Cu (0.14 g, 2.21 mmol), CuI (0.42 g, 2.21 mmol), $K_3PO_4$ (18.75 g, 88.32 mmol), and N,N-dimethylethanolamine (60 mL) is purged with $N_2$. The reaction mixture is then stirred for 2 days at 90° C. under nitrogen. The reaction mixture is quenched with water and extracted with diethyl ether followed by washing with brine. The organic layer is dried over $Na_2SO_4$. The crude compound is purified by column chromatography on silica gel with 0-5% ethyl acetate in hexane as eluent to give 3-dodecylaminothiophene (6a) as a brown solid (5.75 g, 49%). $^1$H-NMR (400 MHz) ppm 7.11 (dd, 1H, J=3.0 Hz, J=5.2 Hz), 6.58 (dd, 1H, J=1.5 Hz, J=5.1 Hz), 5.88 (dd, 1H, J=1.5 Hz, J=3.0 Hz), 3.02 (t, 2H, J=7.1 Hz), 1.58 (m, 2H), 1.35 (m, 18H), 0.86 (t, 3H, J=6.8 Hz).

Example 2

Preparation of 3-thiophenecarbonylchloride (7a)

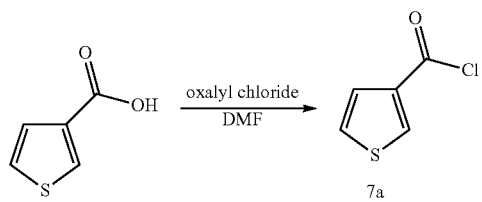

3-thiophenecarboxylic acid (3.50 g, 27.31 mmol) and toluene (80 mL) are added to a round-bottom-flask. Oxalyl chloride (3.57 mL, 40.97 mmol) and DMF (1 drop) are then added to the mixture. The reaction mixture is heated at 80° C. overnight. The solvent is removed under vacuum and the remaining crude solid is dissolved in toluene and dried over calcium hydride followed by evaporation of solvent. 3-thiophenecarbonylchloride (7a) is a brown solid (3.02 g, 75.43%) and is directly used in example 3 without further purification.

Example 3

Preparation of Compound 5a

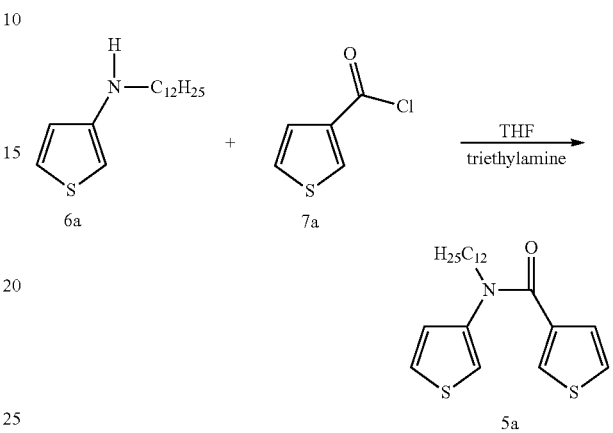

3-dodecylaminothiophene (6a) (5.62 g, 21.01 mmol), THF (40 mL), and triethylamine (3.87 g, 38.20 mmol) are added to a round-bottom-flask under nitrogen. At 0° C., 3-thiophenecarbonylchloride (7a) (2.80 g, 19.10 mmol) in THF (20 mL) is then added drop wise. The reaction mixture is then allowed to warm to room temperature and is stirred overnight. The mixture is poured into water and extracted with dichloromethane. The organic layer is dried over $Na_2SO_4$. The crude compound is purified by column chromatography on silica gel with 0-10% ethyl acetate in hexane as eluent to give compound 5a as light brown solid (6.1 g, 84.6%). $^1$H-NMR (400 MHz) ppm 7.26 (dd, 1H, J=3.2 Hz, J=5.1 Hz), 7.20 (dd, 1H, J=1.1 Hz, J=3.0 Hz), 7.08 (dd, 1H, J=3.0 Hz, J=5.1 Hz), 6.93 (dd, 1H, J=1.2 Hz, J=3.1 Hz), 6.91 (dd, 1H, J=1.1 Hz, J=5.1 Hz), 6.85 (dd, 1H, J=1.3 Hz, J=5.1 Hz), 3.76 (m, 2H), 1.57 (m, 2H), 1.26 (m, 18H), 0.86 (t, 3H, J=6.8 Hz).

Example 4

Preparation of Compound 4a

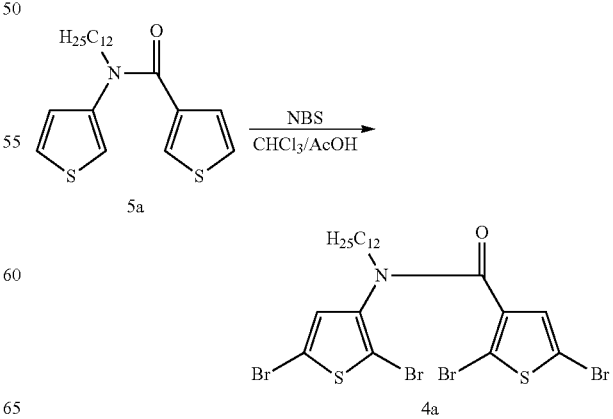

Compound 5a (6.0 g, 15.89 mmol) is dissolved in chloroform (150 mL)/acetic acid (50 mL) mixture. The flask is wrapped with aluminium foil to protect the reaction mixture from light. N-bromosuccinimide (11.31 g, 63.56 mmol) is added, and the reaction mixture is stirred for 2 hours at room temperature followed by stirring at 50° C. The reaction is monitored by thin layer chromatography. Additional amount of NBS is added till the reaction is completed. Water is added to quench the reaction mixture and the reaction mixture is extracted with dichloromethane. The organic layer is dried over $Na_2SO_4$. Crude compound 4a is purified by column chromatography on silica gel with 0-60% dichloromethane in hexane as eluent to give compound 4a as a green liquid. (4.8 g, 42.7%). $^1$H-NMR (400 MHz) ppm 6.87 (s, 1H), 6.67 (s, 1H), 3.69 (m, 2H), 1.54 (d, 2H, J=6.5 Hz), 1.28 (m, 18H), 0.86 (t, 3H, J=6.8 Hz).

Example 5

Preparation of Compound 2a

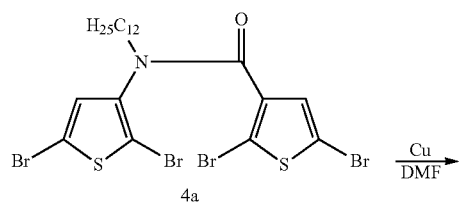

Cu (0.348 g, 5.48 mmol) is added into a round-bottom-flask under $N_2$. Compound 4a (3.80 g, 5.48 mmol) in DMF (260 mL) is added and the reaction mixture is stirred at 110° C. overnight. The reaction is monitored by thin layer chromatography. Additional Cu is added to complete the reaction. The reaction mixture is quenched with water and extracted with diethylether. The organic layer is washed with water and dried over $Na_2SO_4$. Crude compound 2a is purified by column chromatography on silica gel with 0-70% dichloromethane in hexane as eluent to give compound 2a as brown solid (0.44 g, 15.0%). $^1$H-NMR (400 MHz) ppm 7.57 (s, 1H), 7.10 (s, 1H), 4.13 (m, 2H), 1.69 (td, 2H, J=7.6 Hz, J=15.3 Hz), 1.33 (m, 18H), 0.86 (t, 3H, J=6.8 Hz).

Example 6

Preparation of Polymer P1 Essentially Consisting of the Unit of Formula 1b and/or (1' b)

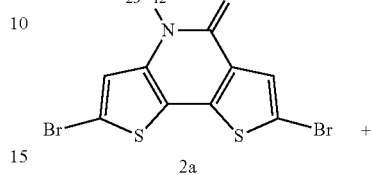

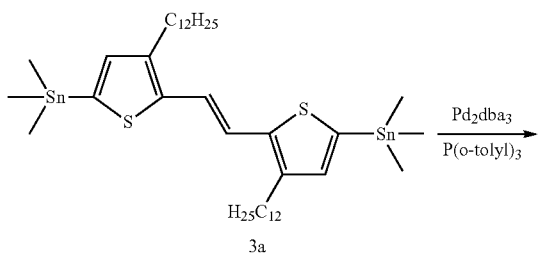

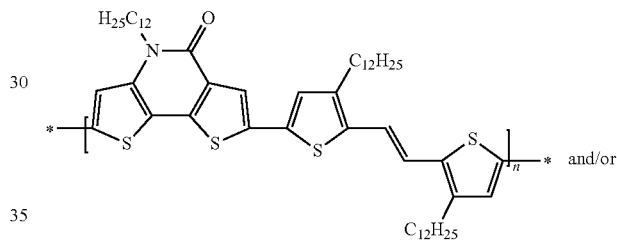

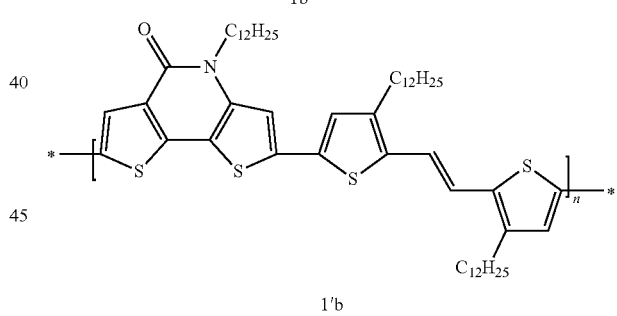

Compound 3a (0.11 g, 0.13 mmol), tris(dibenzylideneacetone)dipalladium(0) ($Pd_2$ $dba_3$) (0.0036 g, 0.004 mmol), and $P(o\text{-tolyl})_3$ (0.0024 g, 0.008 mmol) are added to a round-bottom-flask and purged with $N_2$. Compound 2a (0.07 g, 0.13 mmol) in chlorobenzene (2.5 mL) is then added and the mixture is stirred at 130° C. 2-bromothiophene and 2-tributylstannylthiophene are added to endcap the polymer essentially consisting of the unit of formula 1b and/or 1' b followed by precipitation in methanol and filtration. After overnight Soxhlet extraction with acetone, polymer P1 essentially consisting of the unit of formula 1b and/or 1' b is dissolved in chlorobenzene and reprecipitated in methanol. The final polymer P1 essentially consisting of the unit of formula 1b and/or 1' b is a brown solid (105 mg). $Mn=1.83\times10^4$ g/mol, D=8.6. Elemental analysis (calcd): C, 71.78 (73.36); H, 8.59 (9.07); N, 1.30 (1.56).

Example 7

Preparation of Polymer P2 Essentially Consisting of the Unit of Formula 1c and/or 1'c

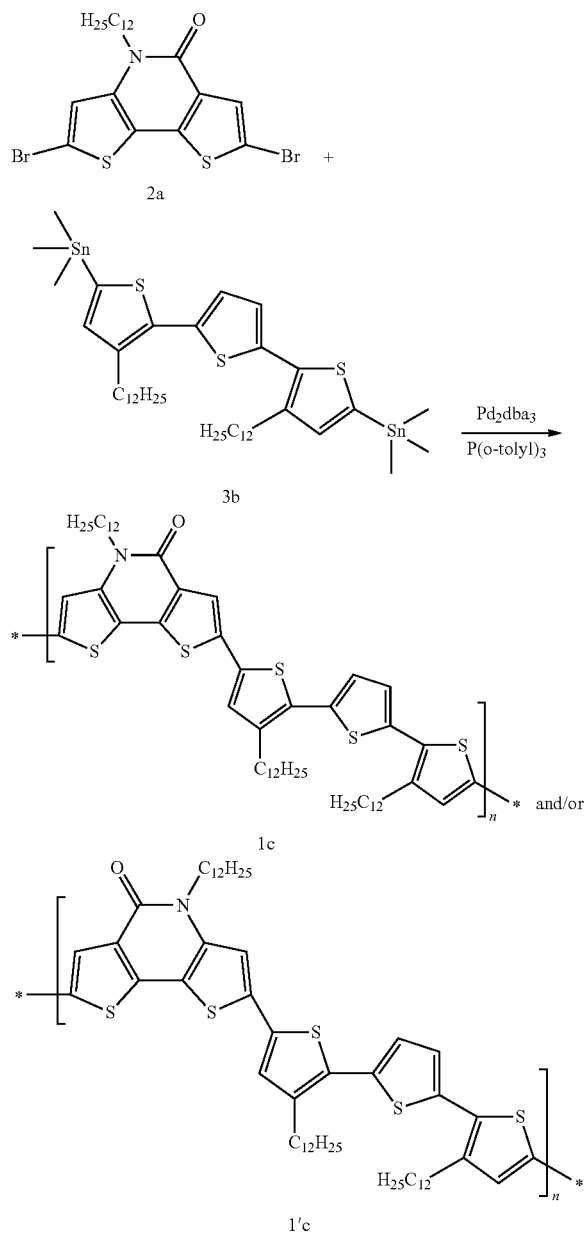

Compound 2a (0.10 g, 0.19 mmol), tris(dibenzylideneacetone)dipalladium(0) (Pd$_2$dba$_3$) (0.0052 g, 0.006 mmol), and P(o-tolyl)$_3$ (0.0034 g, 0.011 mmol) are added to a round-bottom-flask and purged with N$_2$. Compound 3b (0.17 g, 0.19 mmol) in chlorobenzene (7 mL) is then added and the mixture is stirred at 130° C. 2-bromothiophene and 2-tributylstannylthiophene are added to endcap the polymer essentially consisting of the unit of formula 1c and/or 1' c followed by precipitation in methanol and filtration. After overnight Soxhlet extraction with acetone, polymer P2 essentially consisting of the unit of formula 1c and/or 1' c is dissolved in chlorobenzene and reprecipitated in methanol. The final polymer P2 essentially consisting of the unit of formula 1c and/or 1' c is a brown solid (150 mg). Mn=1.64×10$^4$ g/mol, D=3.3. Elemental analysis (calcd): C, 70.75 (71.57); H, 7.67 (8.53); N, 1.43 (1.46).

Example 8

Preparation of Top-Gate Bottom-Contact Transistors (TGBC) Containing the Polymer P1, Respectively, P2 as Semiconducting Material Top-gate bottom-contact (TGBC) thin film transistors (TFTs) are fabricated on glass (PGO glass used as received). Au source-drain contacts (30 nm-thick) are thermally-evaporated. The substrates are then coated with the semiconductor layer (thickness: 30 to 40 nm) by spin-coating (1500 rpm) a solution of polymer P1, respectively, P2 in toluene (concentration ~10 mg/mL), and drying the film at 90° C. for 30 seconds. A 4 weight % polystyrene solution in isopropylacetate is spin-coated (3600 rpm) and the dielectric film formed is dried at 90° C. for 30 seconds to yield a dielectric layer (thickness: 500 to 600 nm). The device structure is completed by vapor deposition of patterned Au gate contacts (~30 nm thick) through a shadow mask. Channel lengths and widths are 50 μm and 0.5 mm, respectively, to afford W/L=10.

The top-gate, bottom-contact (TGBC) thin film transistors of example 8 show the following mobility:
P1: mobility=1.5×10$^{-3}$ cm$^2$V$^{-1}$s$^{-1}$,
P2: mobility=1.3×10$^{-3}$ cm$^2$V$^{-1}$s$^{-1}$.

The invention claimed is:
1. A polymer comprising a unit of formula

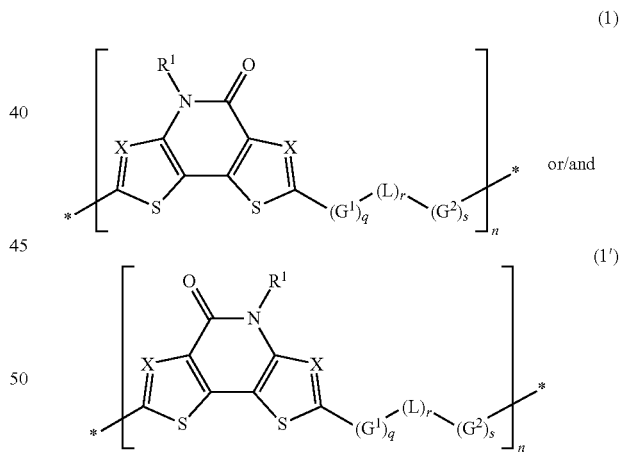

wherein
R$^1$ is H, C$_{1-30}$-alkyl optionally substituted with 1 to 6 substituents R$^c$, C$_{2-30}$-alkenyl optionally substituted with 1 to 6 substituents R$^c$, C$_{2-30}$-alkynyl optionally substituted with 1 to 6 substituents R$^c$, C$_{3-10}$-cycloalkyl optionally substituted with 1 to 6 substituents R$^d$, C$_{5-10}$-cycloalkenyl optionally substituted with 1 to 6 substituents R$^d$, monovalent 3 to 14 membered aliphatic heterocyclic residue optionally substituted with 1 to 6 substituents R$^d$, C$_{6-14}$-aryl optionally substituted with 1 to 6 substituents R$^e$ or monovalent 5 to 14 membered aromatic heterocyclic residue optionally substituted with 1 to 6 substituents R$^e$, wherein $R^c$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{3-10}$-cycloalkyl, monovalent 3 to 14 membered aliphatic heterocyclic residue, C$_{6-14}$-aryl and monovalent 5 to 14 membered aromatic heterocyclic residue;

$R^d$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{1-10}$-alkyl, C$_{2-10}$-alkenyl, C$_{2-10}$-alkynyl, C$_{6-14}$-aryl and monovalent 5 to 14 membered aromatic heterocyclic residue;

$R^e$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^2$, —S—C$_{1-10}$-alkyl, —NH$_2$, —NHR$^2$, —NR$^2$R$^3$, —NH—COR$^2$, —COOH, —COOR$^2$, —CONH$_2$, —CONHR$^2$, —CONR$^2$R$^3$, —CO—H, —COR$^2$, C$_{1-10}$-alkyl, C$_{2-10}$-alkenyl, C$_{2-10}$-alkynyl, C$_{3-10}$-cycloalkyl, C$_{5-10}$-cycloalkenyl and monovalent 3 to 14 membered aliphatic heterocyclic residue, wherein R$^2$ and R$^3$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, X is N or C—R$^4$, wherein R$^4$ is H, C$_{1-30}$-alkyl optionally substituted with 1 to 6 substituents R$^f$, C$_{2-30}$-alkenyl optionally substituted with 1 to 6 substituents R$^f$, C$_{2-30}$-alkynyl optionally substituted with 1 to 6 substituents R$^f$, C$_{3-10}$-cycloalkyl optionally substituted with 1 to 6 substituents R$^g$, C$_{5-10}$-cycloalkenyl optionally substituted with 1 to 6 substituents R$^g$, monovalent 3 to 14 membered aliphatic heterocyclic residue optionally substituted with 1 to 6 substituents R$^g$, C$_{6-14}$-aryl optionally substituted with 1 to 6 substituents R$^h$ or monovalent 5 to 14 membered aromatic heterocyclic residue optionally substituted with 1 to 6 substituents R$^h$, wherein R$^f$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{3-10}$-cycloalkyl, monovalent 3 to 14 membered aliphatic heterocyclic residue, C$_{6-14}$-aryl and monovalent 5 to 14 membered aromatic heterocyclic residue;

R$^g$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{1-10}$-alkyl, C$_{2-10}$-alkenyl, C$_{2-10}$-alkynyl, C$_{6-14}$-aryl and monovalent 5 to 14 membered aromatic heterocyclic residue;

R$^h$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxyl, —O—CH$_2$CH$_2$O—C$_{1-10}$-alkyl, —O—COR$^5$, —S—C$_{1-10}$-alkyl, —NH$_2$, —NHR$^5$, —NR$^5$R$^6$, —NH—COR$^5$, —COOH, —COOR$^5$, —CONH$_2$, —CONHR$^5$, —CONR$^5$R$^6$, —CO—H, —COR$^5$, C$_{1-10}$-alkyl, C$_{2-10}$-alkenyl, C$_{2-10}$-alkynyl, C$_{3-10}$-cycloalkyl, C$_{5-10}$-cycloalkenyl and monovalent 3 to 14 membered aliphatic heterocyclic residue, wherein R$^5$ and R$^6$ at each occurrence are independently from each other selected from the group consisting of C$_{1-10}$-alkyl, C$_{2-10}$-alkenyl, C$_{2-10}$-alkynyl, C$_{3-10}$-cycloalkyl, C$_{5-10}$-cycloalkenyl, monovalent 3 to 14 membered aliphatic heterocyclic residue, C$_{6-14}$-aryl and monovalent 5 to 14 membered aromatic heterocyclic residue, G$^1$ and G$^2$ are independently from each other C$_{6-14}$-arylene optionally substituted with 1 to 6 substituents R$^a$ or bivalent 5 to 14 membered aromatic heterocyclic residue optionally substituted with 1 to 6 substituents R$^a$, wherein R$^a$ at each occurrence are independently from each other selected from the group consisting of =O, =C(CN)$_2$, —O—C$_{2-6}$-alkylene-O—, halogen, —CN, —NO$_2$, —OH, C$_{1-30}$-alkoxyl, —O—CH$_2$CH$_2$O—C$_{1-30}$-alkyl, —O—COR$^8$, —S—C$_{1-30}$-alkyl, —NH$_2$, —NHR$^8$, —NR$^8$R$^9$, —NH—COR$^8$, —COOH, —COOR$^8$, —CONH$_2$, —CONHR$^8$, —CONR$^8$R$^9$, —CO—H, —COR$^8$, C$_{1-30}$-alkyl optionally substituted with 1 to 6 substituents R$^i$, C$_{2-30}$-alkenyl optionally substituted with 1 to 6 substituents R$^i$, C$_{2-30}$-alkynyl optionally substituted with 1 to 6 substituents R$^i$, C$_{3-10}$-cycloalkyl optionally substituted with 1 to 6 substituents R$^j$, C$_{5-10}$-cycloalkenyl optionally substituted with 1 to 6 substituents R$^j$ and monovalent 3 to 14 membered aliphatic heterocyclic residue optionally substituted with 1 to 6 substituents R$^j$, wherein R$^8$ and R$^9$ at each occurrence are independently from each other selected from the group consisting of C$_{1-30}$-alkyl, C$_{2-30}$-alkenyl, C$_{2-30}$-alkynyl, C$_{3-10}$-cycloalkyl, C$_{5-10}$-cyclo-alkenyl, monovalent 3 to 14 membered aliphatic heterocyclic residue, C$_{6-14}$-aryl and monovalent 5 to 14 membered aromatic heterocyclic residue, R$^i$ at each occurrence are independently from each other selected from the group consisting of =O, =C(CN)$_2$, —O—C$_{2-6}$-alkylene-O—, halogen, —CN, —NO$_2$, —OH, C$_{1-10}$-alkoxy, —O—CH$_2$CH$_2$O—C$_{1-10}$-alkyl, —O—COR$^{10}$, —S—C$_{1-10}$-alkyl, —NH$_2$, —NHR$^{10}$, —NR$^{10}$R$^{11}$, NH—COR$^{10}$, —COOH, —COOR$^{10}$, —CONH$_2$, —CONHR$^{10}$, —CONR$^{10}$R$^{11}$, —CO—H, —COR$^{10}$, C$_{3-10}$-cycloalkyl, monovalent 3 to 14 membered aliphatic heterocyclic residue, C$_{6-14}$-aryl and monovalent 5 to 14 membered aromatic heterocyclic residue;

R$^j$ at each occurrence are independently from each other selected from the group consisting of =O, =C(CN)$_2$, —O—C$_{2-6}$-alkylene-O—, halogen, —CN, —NO$_2$, —OH, $C_{1-10}$-alkoxyl, —O—$CH_2CH_2O$—$C_{1-10}$-alkyl, —O—$COR^{10}$, —S—$C_{1-10}$-alkyl, —$NH_2$, —$NHR^{10}$, —$NR^{10}R^{11}$, —NH—$COR^{10}$, —COOH, —$COOR^{10}$, —$CONH_2$, —$CONHR^{10}$, —$CONR^{10}R^{11}$, —CO—H, —$COR^{10}$, $C_{1-10}$-alkyl, $C_{2-10}$-alkenyl, $C_{2-10}$-alkynyl, $C_{6-14}$-aryl and monovalent 5 to 14 membered aromatic heterocyclic residue;

wherein $R^{10}$ and $R^{11}$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, or $G^1$ and $G^2$ are independently from each other

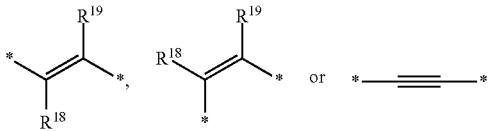

wherein $R^{18}$ and $R^{19}$ are independently from each other H or $C_{1-30}$-alkyl, L is $C_{6-24}$-arylene optionally substituted with 1 to 6 substituents $R^b$ or bivalent 5 to 24 membered aromatic heterocyclic residue optionally substituted with 1 to 6 substituents $R^b$, wherein $R^b$ at each occurrence are independently from each other selected from the group consisting of =O, =$C(CN)_2$, —O—$C_{2-6}$-alkylene-O—, halogen, —CN, —$NO_2$, —OH, $C_{1-30}$-alkoxy, —O—$CH_2CH_2O$—$C_{1-30}$-alkyl, —O—$COR^{12}$, —S—$C_{1-30}$-alkyl, —$NH_2$, —$NHR^{12}$, —$NR^{12}R^{13}$, —NH—$COR^{12}$, —COOH, —$COOR^{12}$, —$CONH_2$, —$CONHR^{12}$, —$CONR^{12}R^{13}$, —CO—H, —$COR^{12}$, $C_{1-30}$-alkyl optionally substituted with 1 to 6 substituents $R^k$, $C_{2-30}$-alkenyl optionally substituted with 1 to 6 substituents $R^k$, $C_{2-30}$-alkynyl optionally substituted with 1 to 6 substituents $R^k$, $C_{3-10}$-cycloalkyl optionally substituted with 1 to 6 substituents $R^l$, $C_{5-10}$-cycloalkenyl optionally substituted with 1 to 6 substituents $R^l$ and monovalent 3 to 14 membered aliphatic heterocyclic residue optionally substituted with 1 to 6 substituents $R^l$, wherein $R^{12}$ and $R^{13}$ at each occurrence are independently from each other selected from the group consisting of $C_{1-30}$-alkyl, $C_{2-30}$-alkenyl, $C_{2-30}$-alkynyl, $C_{3-10}$-cycloalkyl, $C_{5-10}$-cyclo-alkenyl, monovalent 3 to 14 membered aliphatic heterocyclic residue, $C_{6-14}$-aryl and monovalent 5 to 14 membered aromatic heterocyclic residue, $R^k$ at each occurrence are independently from each other selected from the group consisting of =O, =$C(CN)_2$, —O—$C_{2-6}$-alkylene-O—, halogen, —CN, —$NO_2$, —OH, $C_{1-10}$-alkoxyl, —O—$CH_2CH_2O$—$C_{1-10}$-alkyl, —O—$COR^{14}$, —S—$C_{1-10}$-alkyl, —$NH_2$, —$NHR^{14}$, —$NR^{14}R^{15}$, —NH—$COR^{14}$, —COOH, —$COOR^{14}$, —$CONH_2$, —$CONHR^{14}$, —$CONR^{14}R^{15}$, —CO—H, —$COR^{14}$, $C_{3-10}$-cycloalkyl, monovalent 3 to 14 membered aliphatic heterocyclic residue, $C_{6-14}$-aryl and monovalent 5 to 14 membered aromatic heterocyclic residue;

$R^l$ at each occurrence are independently from each other selected from the group consisting of =O, =$C(CN)_2$, —O—$C_{2-6}$-alkylene-O—, halogen, —CN, —$NO_2$, —OH, $C_{1-10}$-alkoxy, —O—$CH_2CH_2O$—$C_{1-10}$-alkyl, —O—$COR^{14}$, —S—$C_{1-10}$-alkyl, —$NH_2$, —$NHR^{14}$, —$NR^{14}R^{15}$, —NH—$COR^{14}$, —COOH, —$COOR^{14}$, —$CONH_2$, —$CONHR^{14}$, —$CONR^{14}R^{15}$, —CO—H, —$COR^{14}$, $C_{1-10}$-alkyl, $C_{2-10}$-alkenyl, $C_{2-10}$-alkynyl, $C_{6-14}$-aryl and monovalent 5 to 14 membered aromatic heterocyclic residue;

wherein $R^{14}$ and $R^{15}$ at each occurrence are independently from each other selected from the group consisting of $C_{1-10}$-alkyl, $C_{2-10}$-alkenyl, $C_{2-10}$-alkynyl, $C_{3-10}$-cycloalkyl, $C_{5-10}$-cycloalkenyl, monovalent 3 to 14 membered aliphatic heterocyclic residue, $C_{6-14}$-aryl and monovalent 5 to 14 membered aromatic heterocyclic residue, or L is

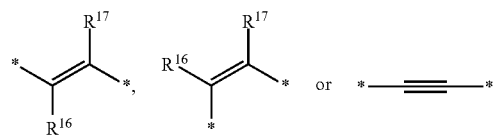

wherein $R^{16}$ and $R^{17}$ are independently from each other H, $C_{1-30}$-alkyl, —CN or halogen, q and s are independently from each other 0, 1, 2, 3, 4 or 5, r is 0, 1 or 2, and n is an integer from 2 to 10,000.

2. The polymer of claim 1, wherein $R^1$ is H or $C_{1-30}$-alkyl optionally substituted with 1 to 6 substituents $R^c$, and X is C—$R^4$, wherein $R^4$ is H or $C_{1-30}$alkyl optionally substituted with 1 to 6 substituents $R^f$.

3. The polymer of claim 1, wherein $R^1$ is $C_{1-30}$-alkyl optionally substituted with 1 to 6 substituents $R^c$, and X is C—$R^4$, wherein $R^4$ is H or $C_{1-30}$-alkyl optionally substituted with 1 to 6 substituents $R^f$.

4. The polymer of claim 1 wherein $R^1$ is $C_{1-30}$-alkyl, and

X is C—$R^4$, wherein $R^4$ is H.

5. The polymer of claim 1, wherein $G^1$ and $G^2$ are independently from each other monocyclic bivalent 5 to 8 membered aromatic heterocyclic residue optionally substituted with 1 to 4 substituents $R^a$.

6. The polymer of claim 1, wherein

L is monocyclic bivalent 5 to 8 membered aromatic heterocyclic residue optionally substituted with 1 to 4 substituents $R^b$, or
L is

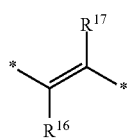

wherein
R$^{16}$ and R$^{17}$ are independently from each other H or C$_{1-30}$-alkyl.

7. The polymer of claim 1, wherein
G$^1$ and G$^2$ are independently from each other monocyclic bivalent 5 to 8 membered aromatic heterocyclic residue optionally substituted with 1 to 4 substituents R$^a$,
wherein
R$^a$ at each occurrence are independently from each other C$_{1-30}$-alkyl.

8. The polymer of claim 1, wherein
L is monocyclic bivalent 5 to 8 membered aromatic heterocyclic residue, wherein L can be optionally substituted with 1 to 4 substituents R$^b$,
wherein
R$^b$ at each occurrence are independently from each other C$_{1-30}$-alkyl,
or
L is

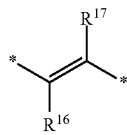

wherein
R$^{16}$ and R$^{17}$ are both H.

9. The polymer of claim 1, wherein
q and s are both 1,
r is 1,
and
n is an integer from 5 to 10,000.

10. The polymer of claim 1, wherein the unit of formula (1) is a unit of formula

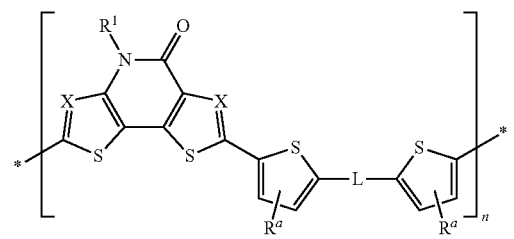

and/or

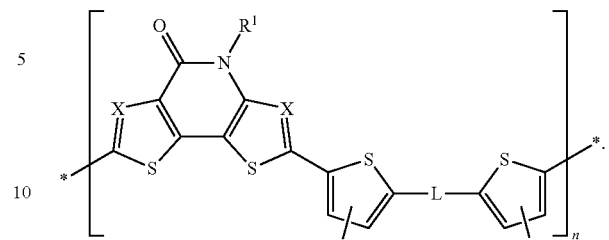

11. The polymer of claim 10, wherein
L is

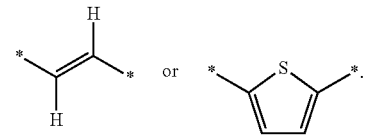

12. The polymer of claim 10, wherein
R$^1$ is C$_{1-30}$-alkyl optionally substituted with 1 to 6 substituents R$^c$,
and X is C—R$^4$,
wherein
R$^4$ is H or C$_{1-30}$-alkyl optionally substituted with 1 to 6 substituents R$^f$.

13. The polymer of claim 10, wherein
R$^1$ is C$_{1-30}$-alkyl,
X is C—H, and
R$^a$ at each occurrence are independently from each other C$_{1-30}$-alkyl.

14. The polymer of claim 1, wherein n is an integer from 5 to 5,000.

15. An electronic device comprising the polymer of claim 1 as semiconducting material.

16. The electronic device of claim 15, wherein the electronic device is an organic field effect transistor (OFET).

17. The electronic device of claim 15, wherein the electronic device is an organic photovoltaic device (OPV).

18. A semiconducting material comprising the polymer of claim 1.

19. The polymer of claim 1, wherein n is an integer of 5 to 1,000.

20. The polymer of claim 1, wherein n is an integer of 10 to 100.

* * * * *